United States Patent
Choi et al.

(10) Patent No.: US 9,204,150 B2
(45) Date of Patent: Dec. 1, 2015

(54) TECHNIQUES FOR EVALUATING COMPRESSED MOTION VIDEO QUALITY

(71) Applicant: Intel Corporation, Santa Clara, CA (US)

(72) Inventors: Lark Kwon Choi, Austin, TX (US); Yiting Liao, Hillsboro, OR (US); Audrey C. Younkin, Hillsboro, OR (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 14/190,215

(22) Filed: Feb. 26, 2014

(65) Prior Publication Data

US 2015/0245028 A1   Aug. 27, 2015

(51) Int. Cl.
- *G06K 9/00* (2006.01)
- *H04N 19/124* (2014.01)
- *H04N 19/463* (2014.01)

(52) U.S. Cl.
CPC ........... *H04N 19/124* (2014.11); *H04N 19/463* (2014.11)

(58) Field of Classification Search
USPC ......... 382/251, 232, 235, 236, 237, 238, 239, 382/240, 166, 253; 348/14.09, 398.1, 348/406.1; 358/426, 427, 428, 429, 430, 358/456, 457, 458; 364/526; 375/E7.048, 375/240.08, 240.02, 240.16, 240.19, 240.2
See application file for complete search history.

(56) References Cited

U.S. PATENT DOCUMENTS

| | | | |
|---|---|---|---|
| 6,125,201 A * | 9/2000 | Zador | 382/166 |
| 6,865,291 B1 * | 3/2005 | Zador | 382/166 |
| 2012/0183053 A1 | 7/2012 | Lu et al. | |
| 2013/0057705 A1 | 3/2013 | Parker et al. | |

FOREIGN PATENT DOCUMENTS

JP   2009044393   2/2009

OTHER PUBLICATIONS

International Search Report and Written Opinion received for PCT Patent Application No. PCT/US2015/012985, mailed Apr. 25, 2015, 10 pages.

(Continued)

*Primary Examiner* — Anh Do
(74) *Attorney, Agent, or Firm* — Kacvinsky Daisak Bluni PLLC

(57) ABSTRACT

Various embodiments are generally directed to techniques for evaluating the resulting image quality of compression of motion videos as an input to controlling the degree of compression. A device to compress motion video includes a compressor to compress a first uncompressed frame of a motion video to generate a first compressed frame of the motion video for a viewing device having at least one viewing characteristic, and a mean opinion score (MOS) estimator to combine a structural metric of image quality of the first compressed frame and an opinion metric of image quality associated with the at least one viewing characteristic to determine whether to alter a quantization parameter (QP) of the compressor to compress a second uncompressed frame of the motion video. Other embodiments are described and claimed.

25 Claims, 11 Drawing Sheets

(56) References Cited

OTHER PUBLICATIONS

Xue et al., "Perceptual Video Quality Assessment on a Mobile Platform Considering Both Spatial Resolution and Quantization Artifacts", Proceedings of 2010 IEEE 18th International Packet Video Workshop, Dec. 13-14, 2010, 8 pages.

Wang et al., "Image Quality Assessment: From Error Visibility to Structural Similarity", IEEE Transactions on Image Processing, vol. 13, No. 4, April 2004, 14 pages.

* cited by examiner

4000

US 9,204,150 B2

TECHNIQUES FOR EVALUATING COMPRESSED MOTION VIDEO QUALITY

BACKGROUND

Various forms of video compression have been devised to compress motion video for storage and/or transmission, including various versions of the Motion Picture Experts Group (MPEG) specification promulgated by the International Organization for Standardization of Geneva, Switzerland, and the H.26x series of specifications promulgated by the International Telegraph Union (ITU) also of Geneva, Switzerland. Such forms of video compression employ lossy techniques that take advantage of various characteristics commonly observed in many pieces of motion video and of various limitations of the human visual system (HVS).

Among those techniques is quantization of blocks of coefficients of each frame of a motion video in the frequency domain to remove higher frequency components that are less perceptible to the HVS, and are therefore less likely to be missed during video playback. The extent to which higher frequency components are removed is usually controllable via one or more quantization parameters (QPs), and thus provides a mechanism by which a tradeoff between image quality and the data size of each frame of a motion video may be selected. As familiar to those skilled in the art, there is no single ideal QP setting that can be applied across all motion videos, or even through the entire length of most motion videos. Depending on the content of a portion of a motion video (e.g., colors, lighting, intricacies of patterns, extent and direction of movement, etc.), a selected QP value may cause one portion of a motion video to be perceived as having good image quality while also causing another portion of the same motion video to be perceived as having poor image quality.

It has become commonplace, during compression of a motion video, to evaluate the resulting image quality per compressed frame as an input to dynamically adjusting one or more QPs to at least prevent image quality from falling below a predetermined level. This is done even where the motion video is desired to be compressed relatively aggressively to cause its compressed form to fit within a relatively restrictive predetermined bit rate for transmission or overall data size for storage. Unfortunately, typical evaluation techniques tend to take into account only characteristics of the compressed frames of video, and do not take into account differences in the conditions under which the compressed motion video will ultimately be decompressed and viewed.

DETAILED DESCRIPTION

Figure 1:
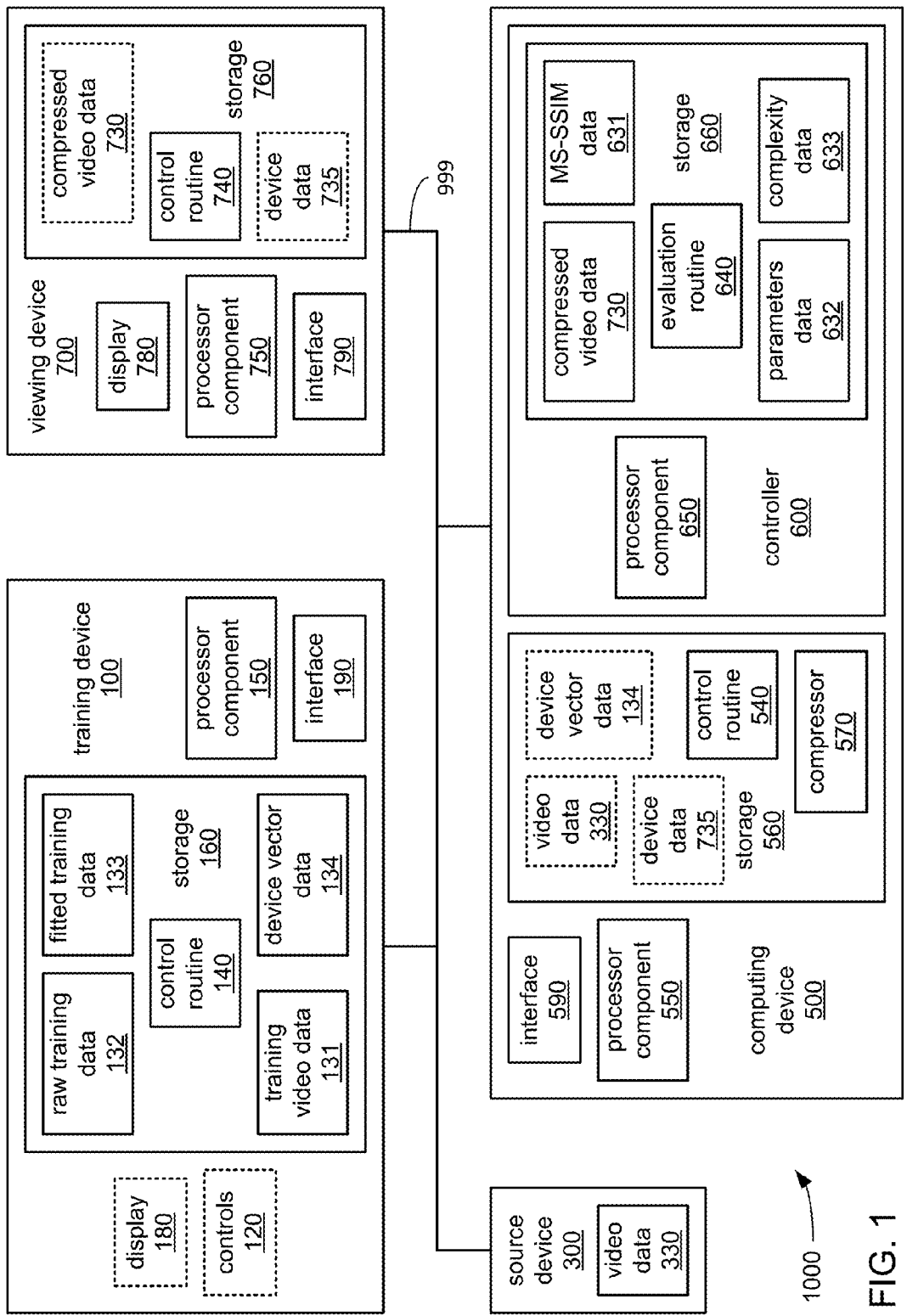
FIG. 1 illustrates an embodiment of a video processing system.

Various embodiments are generally directed to techniques for evaluating the resulting image quality of compression of motion videos as an input to controlling the degree of compression. A structural metric of image quality of a motion video based on signal analysis theory is combined with an opinion metric of image quality associated with viewing devices of selected viewing characteristics in viewing a selected set of motion videos. The signal analysis theory of the structural metric is based on studies of the manner in which the human visual system (HVS) responds to images as signals, and more specifically, the manner in which the HVS responds to various structural characteristics of those signals. The selected viewing characteristics of viewing devices that are accounted for with the opinion metric include one or more of display size, display resolution and associated viewing distance.

During a training phase, numerous motion videos of a training set of motion videos are visually presented on a display of a viewing device having a selected viewing characteristics, and raw data is collected of opinions of persons to whom those visual presentations are made. In some embodiments, the raw data may be made up of numeric values representing image quality as judged by those persons, and the range of numeric values may be from 1 to 5 in keeping with the widely known and used mean opinion score (MOS) evaluation technique. The motion videos of the training set may be selected for their spatial complexities to provide the training set with a relatively even distribution of a range of spatial complexity values. The raw data is then analyzed to derive first and second mathematical models based on the raw data. Each of the first and second mathematical models may correspond to a curve fitted to the raw data and are represented by first and second sets of coefficients, respectively, for use with a non-linear fitting function.

For each of the motion videos of the training set, its metric of spatial complexity is used with the first set of coefficients to derive a corresponding first linear coefficient, and then pairs of those spatial complexities and corresponding first linear coefficients are combined to form a first vector. Correspondingly, the metric of spatial complexity of each of the motion videos of the training set is used with the second set of coefficients to derive a corresponding second linear coefficient, and then pairs of those spatial complexities and corresponding second linear coefficients are combined to form a second vector. Together, the first and second vectors correlate a range of spatial complexities to linear coefficients indicative of opinion metrics associated with viewing devices having the selected set of characteristics.

During a later encoding phase, another motion video is compressed by a compressor for viewing on a viewing device having similar viewing characteristics using any of a variety of lossy motion video compression algorithms. In some embodiments, the compression algorithm may be one of the various versions of MPEG. During its compression, the frames of the compressed and uncompressed forms of the motion video are analyzed together using a structural signals analysis technique to derive structural distortion score values. In some embodiments, the signals analysis technique may be a version of multi-scale structural similarity (MS-SSIM), which is a derivative of the widely known and used structural similarity (SSIM) evaluation technique.

Also during the compression of the motion video, the frames of the compressed form of the motion video are analyzed to derive various parameters of each frame, including one or more of a quantization parameter employed in compressing it, its data size (e.g., its size in bits or bytes), its frame type and its resolution. The derived parameters of each frame are then employed to calculate a spatial complexity for each frame. The derived spatial complexity value of each frame is then employed in selecting the ones of the first and second linear coefficients from the first and second vectors, respectively.

The selected first and second linear coefficients for each frame are then employed to derive a corresponding estimated MOS for each frame. In some embodiments, the range of values of the estimated MOS for each frame may be subjected to limits that maintain the estimated MOS for every frame within a predetermined range of numerical values. In such embodiments, the range may again be from 1 to 5. The resulting estimated MOS may then be employed to determine whether to signal the compressor employed to compress the motion video to alter a quantization parameter (QP) of the lossy motion video compression algorithm that it employs in compressing the motion video. Such signals to alter a QP result in a change to the quantity of bits employed in compressing each frame for either storage or transmission.

With general reference to notations and nomenclature used herein, portions of the detailed description which follows may be presented in terms of program procedures executed on a computer or network of computers. These procedural descriptions and representations are used by those skilled in the art to most effectively convey the substance of their work to others skilled in the art. A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, these manipulations are often referred to in terms, such as adding or comparing, which are commonly associated with mental operations performed by a human operator. However, no such capability of a human operator is necessary, or desirable in most cases, in any of the operations described herein that form part of one or more embodiments. Rather, these operations are machine operations. Useful machines for performing operations of various embodiments include general purpose digital computers as selectively activated or configured by a computer program stored within that is written in accordance with the teachings herein, and/or include apparatus specially constructed for the required purpose. Various embodiments also relate to apparatus or systems for performing these operations. These apparatus may be specially constructed for the required purpose or may include a general purpose computer. The required structure for a variety of these machines will appear from the description given.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives within the scope of the claims.

FIG. 1 illustrates a block diagram of an embodiment of a video processing system 1000 incorporating one or more of a training device 100, a source device 300, a computing device 500 and a viewing device 700. During a training phase in the video processing system 1000, the training device 100 generates a device vector data 134 that correlates a range of spatial complexities of motion videos to linear coefficients indicative of opinion metrics of viewing devices having selected viewing characteristics. The training device 100 then provides the device vector data 134 to the computing device 500 for later use in compressing motion videos for viewing with viewing devices having similar viewing characteristics. During a later encoding phase, the computing device 500 compresses a motion video represented in uncompressed form by video data 330 to generate compressed video data 730 that represents the same motion video in compressed form for viewing using the viewing device 700. The computing device 500 may receive the video data 330 from the source device 300. The viewing device 700 has viewing characteristics similar to the viewing characteristics associated with the device vector data 134. The computing device 500 employs a combination of structural metrics of the image quality of the motion video in its compressed form and opinion metrics associated with the vector data 134 to control the degree of compression of the motion video. Thus, the compressed video data 730 represents the motion video compressed in a manner taking into account viewing characteristics similar to those of the viewing device 700. The computing device 500 provides the compressed video data 730 to the viewing device 700. Each of these computing devices may be any of a variety of types of computing device, including without limitation, a desktop computer system, a data entry terminal, a laptop computer, a netbook computer, a tablet computer, a handheld personal data assistant, a smartphone, smart glasses, a smart wristwatch, a digital camera, a body-worn computing device incorporated into clothing, a computing device integrated into a vehicle (e.g., a car, a bicycle, a wheelchair, etc.), a server, a cluster of servers, a server farm, etc.

As depicted, these computing devices 100, 300, 500 and 700 exchange signals conveying compressed and/or uncompressed data representing motion video and/or data related to image quality of motion video compression through a network 999. However, one or more of these computing devices may exchange other data entirely unrelated to motion video or image quality with each other and/or with still other computing devices (not shown) via the network 999. In various embodiments, the network may be a single network possibly limited to extending within a single building or other relatively limited area, a combination of connected networks possibly extending a considerable distance, and/or may include the Internet. Thus, the network 999 may be based on any of a variety (or combination) of communications technologies by which signals may be exchanged, including without limitation, wired technologies employing electrically and/or optically conductive cabling, and wireless technologies employing infrared, radio frequency or other forms of wireless transmission.

In various embodiments, the training device 100 incorporates one or more of a processor component 150, a storage 160, controls 120, a display 180 and an interface 190 to couple the training device 100 to the network 999. The storage 160 stores one or more of a control routine 140, training video data 131, raw training data 132, fitted training data 133 and the device vector data 134. The training video data 131 is made up of pieces of data representing multiple motion videos that together form a training set of motion videos. In some embodiments, the training video data 131 may represent at least a portion of a database of motion videos. The motion videos of the training set may be selected for their spatial complexity to cause the training set to cover a selected range of spatial complexities and/or to impart a selected distribution of spatial complexities to the training set (e.g., an even distribution, a bell-curve distribution, etc.).

The control routine 140 incorporates a sequence of instructions operative on the processor component 150 in its role as a main processor component of the training device 100 to implement logic to perform various functions. In executing the control routine 140 during a training phase, the processor component 150 may transmit or otherwise provide motion videos from the training video data 131 to a viewing device of selected characteristics to be visually presented by that viewing device. The processor component 150 then receives and store indications of opinion scores associated with those visual presentations as the raw training data 132 from which the processor component 150 subsequently derives the device vector data 134 that the processor component 150 provides to the computing device 500.

Figure 3:
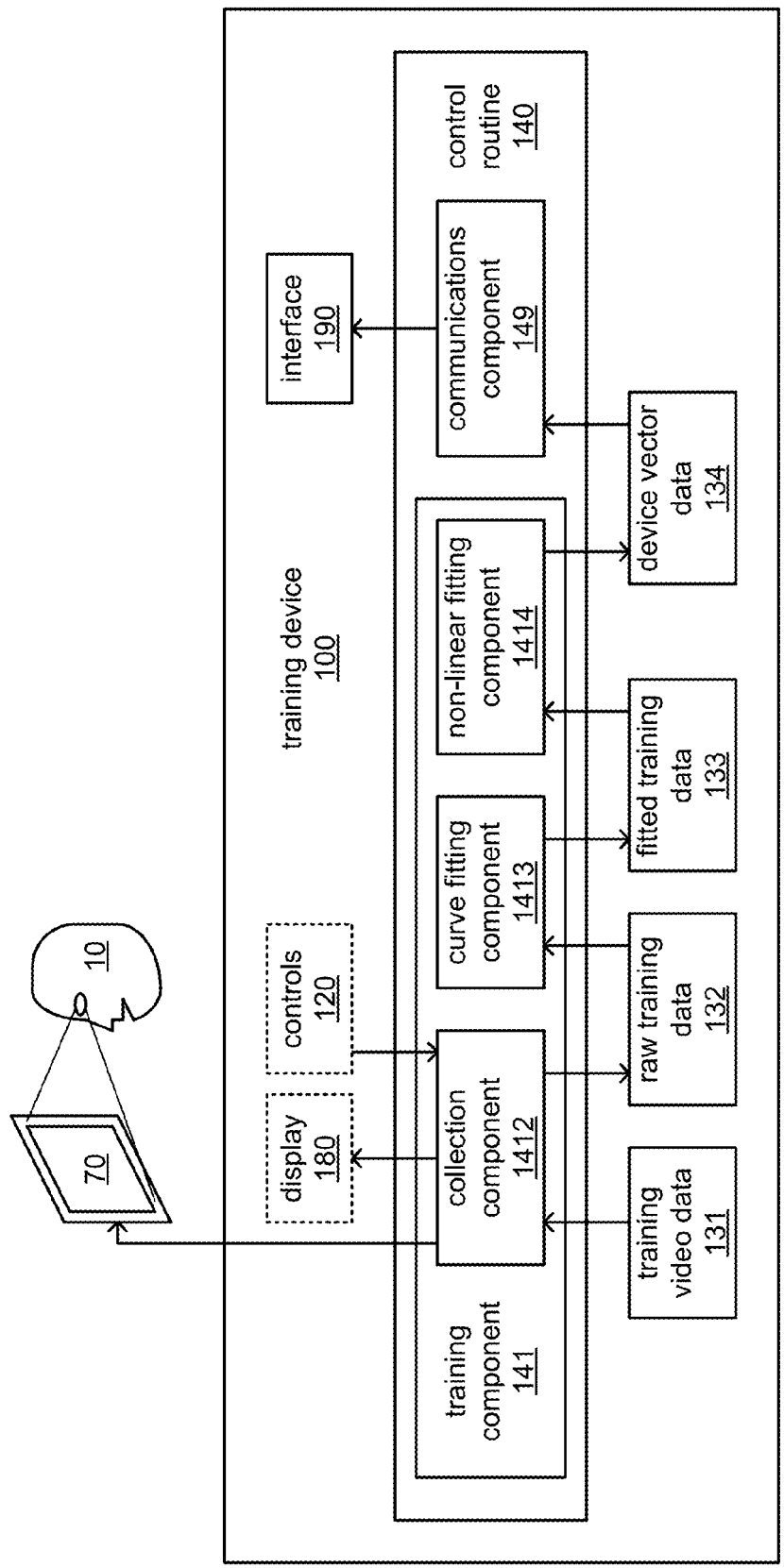
FIG. 3 illustrates a portion of an embodiment.
Figure 4:
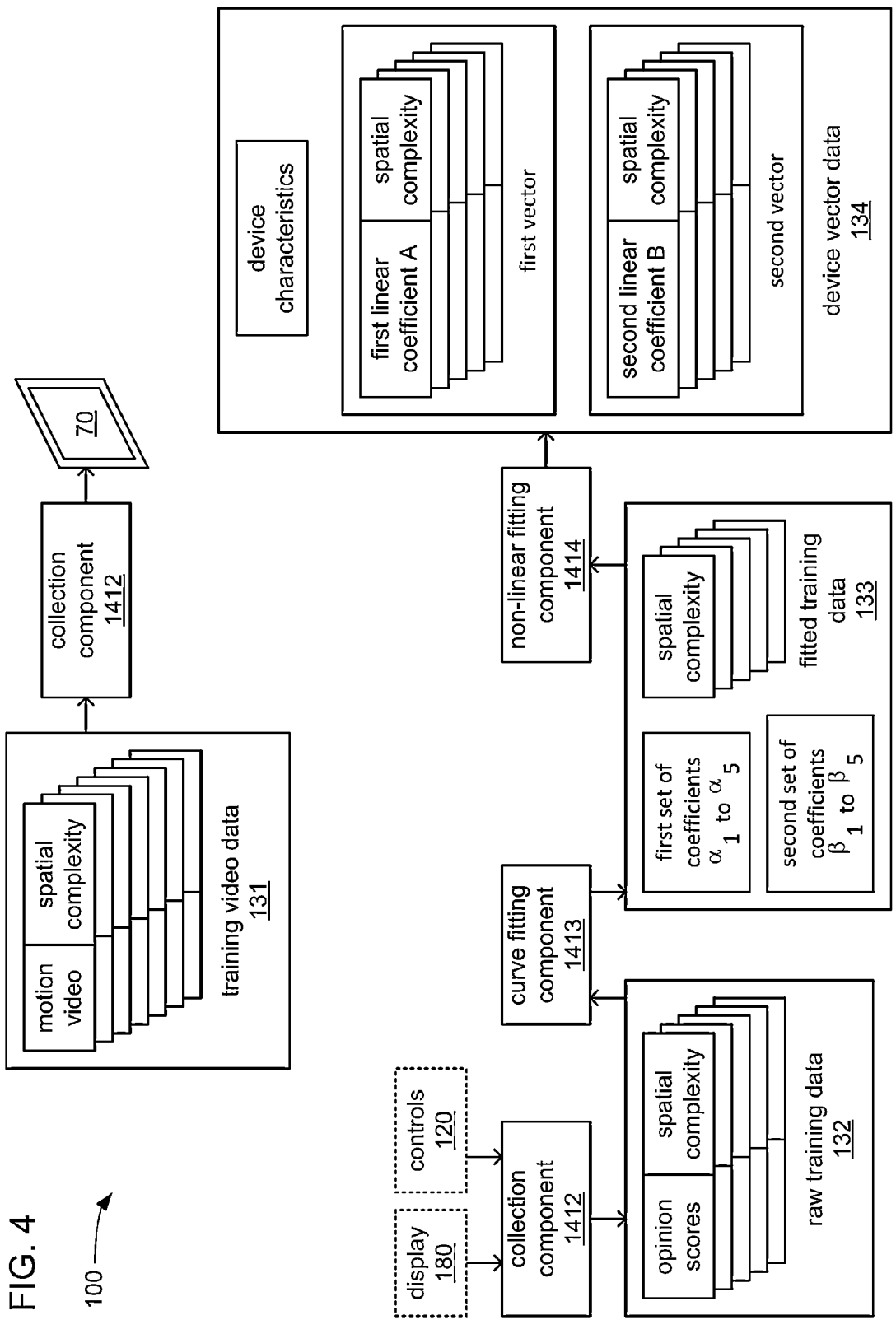
FIG. 4 illustrates an embodiment of data structures of the portion of FIG. 3.

FIG. 3 depicts an embodiment of such operation of the training device 100 in a training phase in greater detail, and FIG. 4 depicts aspects of data exchanged between components and/or other portions of that embodiment during such operation in a training phase in greater detail. As depicted, the control routine 140 may incorporate one or more of a training component 141 and a communications component 149. Further, the training component 141 may incorporate one or more of a collection component 1412, a curve fitting component 1413 and a non-linear fitting component 1414. In executing the control routine 140, the processor component 150 may execute one or more of the components 1412, 1413 and 1414 of the training component 141, as well as the communications component 149.

The collection component 1412 may provide motion videos of the training video data 131 to a viewing device 70 for visual presentation by a display of the viewing device to one or more persons 10. As depicted in FIG. 4, the training video data 131 may also include indications of the spatial complexity for each of the motion videos of the training set. Alternatively, the collection component 1412 may derive the spatial complexities of each of these motion videos. In some embodiments, each indication of spatial complexity stored in the training video data 131 for one of the motion videos of the training set may be numerical value representing the average spatial complexity across all of the frames of the motion video.

The collection component 1412 may also operate the controls 120 and/or the display 180 to provide a user interface for use by persons viewing the motion videos of the training video data 131 to provide opinion scores of the image quality of each of the motion videos as visually presented by the viewing device 70. The controls 120 may be any of a variety of types of input device, including and not limited to a keyboard, a pointing device, etc. The display 180 may be based on any of a variety of display technologies, including and not limited to liquid crystal display (LCD) technology, electroluminescent (EL) technology, etc. Alternatively or additionally, the controls 120 and the display 180 may be combined into a single user interface device such as a touchscreen. Regardless of how the opinion scores are received from those persons, the collection component 1412 stores those opinion scores as the raw training data 132. As depicted in FIG. 4, the opinion scores may be organized per motion video of the training set within the raw training data 132, and may be correlated to indications of the spatial complexity for each of the motion videos of the training set that may also be included in the raw training data 132.

The curve fitting component 1413 may treat the opinion scores of the raw training data 132 as points, and may analyze those opinion scores by fitting first and second curves to those points to derive first and second mathematical models, respectively, of the mathematical relationship of the opinion scores to the spatial complexities of each of the motion videos of the training set. In so deriving the first and second mathematical models, the fitting component 1413 may derive first and second sets of coefficients to represent the first and second mathematical models, and store them as the fitted training data 133. As depicted in FIG. 4, the fitted training data 133 may include indications of the spatial complexity for each of the motion videos of the training set.

The non-linear fitting component 1414 may employ the first and second sets of coefficients of the fitted training data 133 to derive first and second linear coefficients, respectively, for each of the different spatial complexity associated with each of the motion videos of the training set. In other words, separate first and second linear coefficients are generated for each of the spatial complexities. The non-linear fitting component 1414 may then generate a first vector made up of all of the first linear coefficients paired with their corresponding ones of the spatial complexities of the motion videos of the training set, and may store the first vector as the device vector data 134. Correspondingly, the non-linear fitting component 1414 may also generate a second vector made up of all of the second linear coefficients paired with their corresponding ones of the spatial complexities of the motion videos of the training set, and may store the second vector as another part of the device vector data 134. As will be explained in greater detail, the pairing of these spatial complexities with their corresponding ones of the first and second linear coefficients in the first and second vectors, respectively, may enable particular ones of the first and second linear coefficients to be selected during a later encoding phase based on a spatial complexity of a frame of another compressed motion video.

In some embodiments, the first set of coefficients may be made up of a set of five coefficients $\alpha_1$ through $\alpha_5$, and the second set of coefficients may be made up of another set of five coefficients $\beta_1$ through $\beta_5$. As previously discussed, each of the first and second sets of coefficients may be representative of first and second curves, respectively, fitted to the opinion scores making up the raw training data 132 by treating those opinion scores as points. The fitting of the first and second curves may be through an iterative process in which a measure of error derived from an error analysis function (e.g., least squared, etc.) is sought to be minimized to within a predetermined threshold. In such an iterative process, the coefficients $\alpha_1$ through $\alpha_5$ and $\beta_1$ through $\beta_5$ may be given initial values describing initial versions of the first and second curves, respectively. By way of example, for the first curve, the coefficient $\alpha_1$ may initially represent a maximum, the coefficient $\alpha_2$ may initially represent a minimum, the coefficient $\alpha_3$ may initially represent an average or mean multiplied by a constant, the coefficient $\alpha_4$ may initially be defined as a constant having the value of 1, and the coefficient $\alpha_5$ may initially be defined as a constant having the value of 0. Correspondingly, for the second curve, the coefficient $\beta_1$ may initially represent a maximum, the coefficient $\beta_2$ may initially represent a minimum, the coefficient $\beta_3$ may initially represent an average or mean multiplied by a constant, the coefficient $\beta_4$ may initially be defined as a constant having the value of 1, and the coefficient $\beta_5$ may initially be defined as a constant having the value of 0. Through the performance of multiple iterations, these initial values are replaced of progressively more refined values until the measure of error is sufficiently reduced such that cessation of the performance of iterations is stopped.

The first set of coefficients $\alpha_1$ through $\alpha_5$ may be employed in the following equation to determine the first linear coefficient A for each spatial complexity SC of each of the motion videos of the training set:

$$A = \alpha_1 \times \left(0.5 - \frac{1}{\exp(\alpha_2 \times (SC - \alpha_3))}\right) + \alpha_4 \times SC + \alpha_5$$

Correspondingly, the second set of coefficients $\beta_1$ through $\beta_5$ may be employed in the following equation to determine the second linear coefficient B for each spatial complexity SC of each of the motion videos of the training set:

$$B = \beta_1 \times \left(0.5 - \frac{1}{\exp(\beta_2 \times (SC - \beta_3))}\right) + \beta_4 \times SC + \beta_5$$

Thus, in such embodiments, the first vector is made up of multiple correlated values for linear coefficient A and spatial complexity SC, and the second vector is made up of multiple correlated values for linear coefficient B and spatial complexity SC.

The viewing device 70 may be any of a variety of types of device, including and not limited to a form of computing device, or a device more dedicated in its functionality to the viewing of motion video such as a television. The viewing device 70 has one or more viewing characteristics that may be germane to the perception of the image quality of the motion videos of the training video data 131 by the persons viewing them as those motion videos are visually presented by the viewing device 70. In particular, studies have revealed that the size and resolution of the display on which motion video is visually presented for viewing, and the viewing distance of a person's eyes from the display tend have greater influence on perceived image quality than many other characteristics of a viewing device.

As familiar to those skilled in the art of human factors in view motion videos, various characteristics of a viewing device, such as its physical size or shape, its weight, and/or what features it possesses for being held in a hand or otherwise supported by another object may tend to encourage a specific viewing distance or range of viewing distances for viewing motion videos. Thus, although a viewing distance is not actually a viewing characteristic of the viewing device itself, and is typically chosen by a person engaged in viewing a motion video, various other viewing characteristics of the viewing device may tend to influence the choice of viewing distance sufficiently that there may be a correlation between those viewing characteristics of the viewing device itself and the viewing distance. It may be that multiple devices having displays of similar size and resolution tend to encourage a similar choice in viewing distance, and therefore, knowing the display size and resolution may enable the viewing distance to be determined with a relatively high degree of certainty. However, there may also be particular viewing devices with other characteristics unique to them that override the influence of such viewing characteristics as display size and resolution such that knowing the identity of the particular viewing device (e.g., its manufacturer and/or model number) may be more useful in determining the viewing distance.

Thus, as depicted in FIG. 4, the device vector data 134 may also include an indication of device viewing characteristics of the viewing device 70. As will be explained in greater detail, this indication of device viewing characteristics may be employed to enable the selection of the first and second vectors for use controlling the compression of another motion video for another viewing device that may not be of the same manufacturer or model as the viewing device 70, but which may have some similar viewing characteristics.

Following generation of the device vector data 134, the communications component 149 may operate the interface 190 to transmit the device vector data 134 to the computing device 500 via the network 900. Alternatively or additionally, other mechanisms including removable storage media may be employed to convey the device vector data 134 to the computing device 500.

In various embodiments, the computing device 500 incorporates one or more of a processor component 550, a storage 560, a controller 600 and an interface 590 to couple the computing device 500 to the network 999. The storage 560 stores one or more of a control routine 540, a compressor 570, the device vector data 134, the video data 330 and device data 735. The controller 600 incorporates one or more of a processor component 650 and a storage 660. The storage 660 stores one or more of an evaluation routine 640, MS-SSIM data 631, parameters data 632, complexity data 633 and the compressed video data 730.

Each of the control routine 540 and the compressor 570 incorporates a sequence of instructions operative on the processor component 550 in its role as a main processor component of the computing device 500 to implement logic to perform various functions. In executing the control routine 540 in some embodiments, the processor component 550 may receive the video data 330 representing a motion video to be compressed and provided to the viewing device 700 from the source device 300, and may store at least a subset thereof in the storage 560. It should be noted that the video data 330 may be stored in the storage 560 for a considerable amount of time before any use is made of it, including compression, decompression and/or transmission thereof. Where the video data 330 is in compressed form, the processor component 550, in executing the control routine 540, may decompress it. Where the video data 330 requires color space conversion in preparation for being compressed, the processor component 550, in executing the control routine 540, may convert its color space. It is in executing the compressor 570 that processor component 550 compresses the video data 330 to generate the compressed video data 730. Either following or during such compression, the processor component 550, in further executing the control routine 540, provides the compressed video data 730 to the viewing device 700 for viewing.

The evaluation routine 640 incorporates a sequence of instructions operative on the processor component 650 in its role as a controller processor component of the controller 600 of the computing device 500 to implement logic to perform various functions. In executing the evaluation routine 640 in an encoding phase, the processor component 650 evaluates the image quality of each frame of the motion video represented by the compressed video data 730 in compressed form to determine whether to adjust the degree of compression. It should be noted that the evaluation routine 640 is executed by the processor component 650 substantially simultaneously with execution of the compressor 570 by the processor component 550 to enable the processor component 650 to monitor the motion video compression performed by the processor component 550 and to signal the processor component 550 to alter the degree of compression as the motion video compression is in progress.

Figure 5:
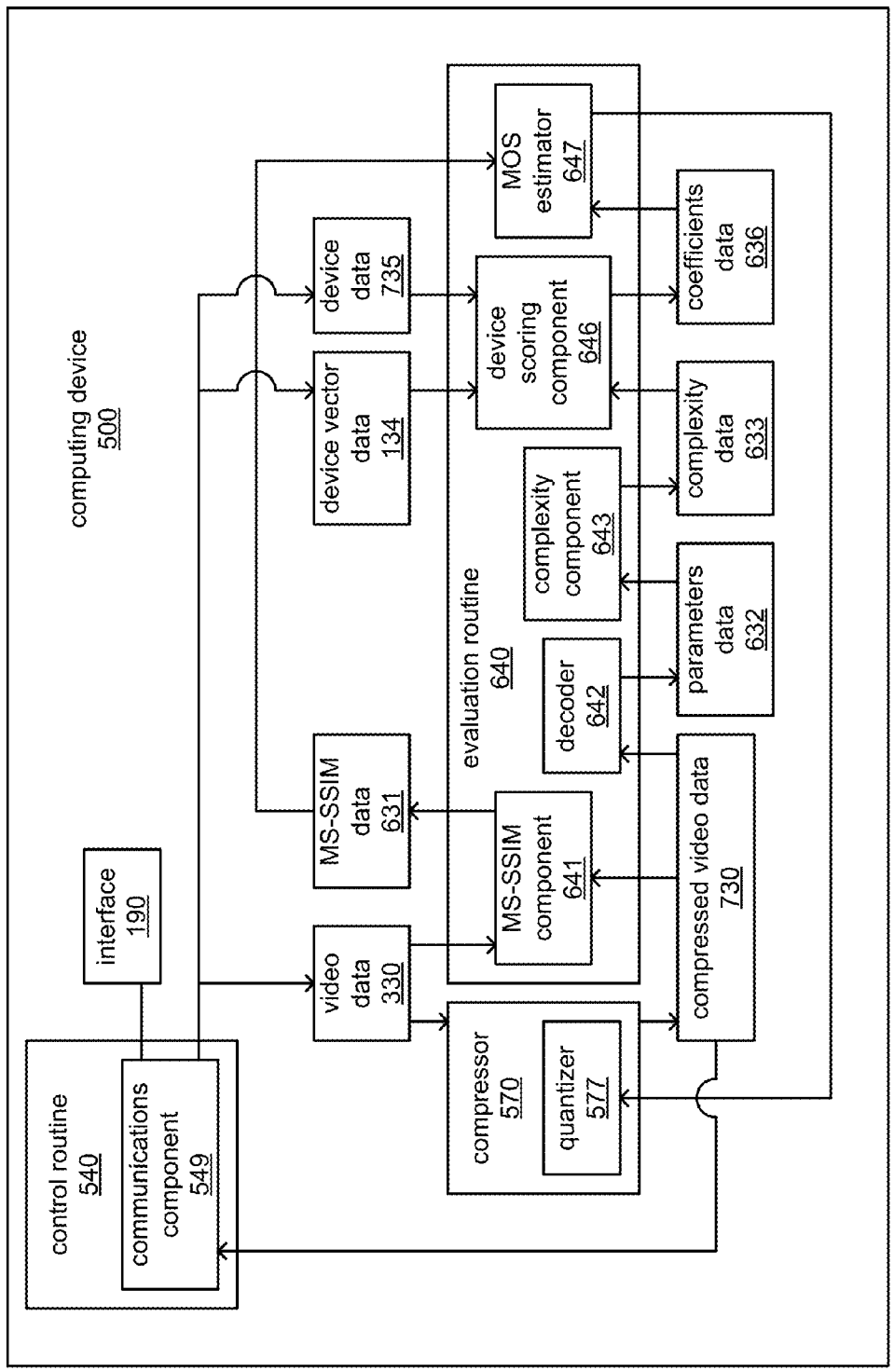
FIG. 5 illustrates another portion of an embodiment.
Figure 6:
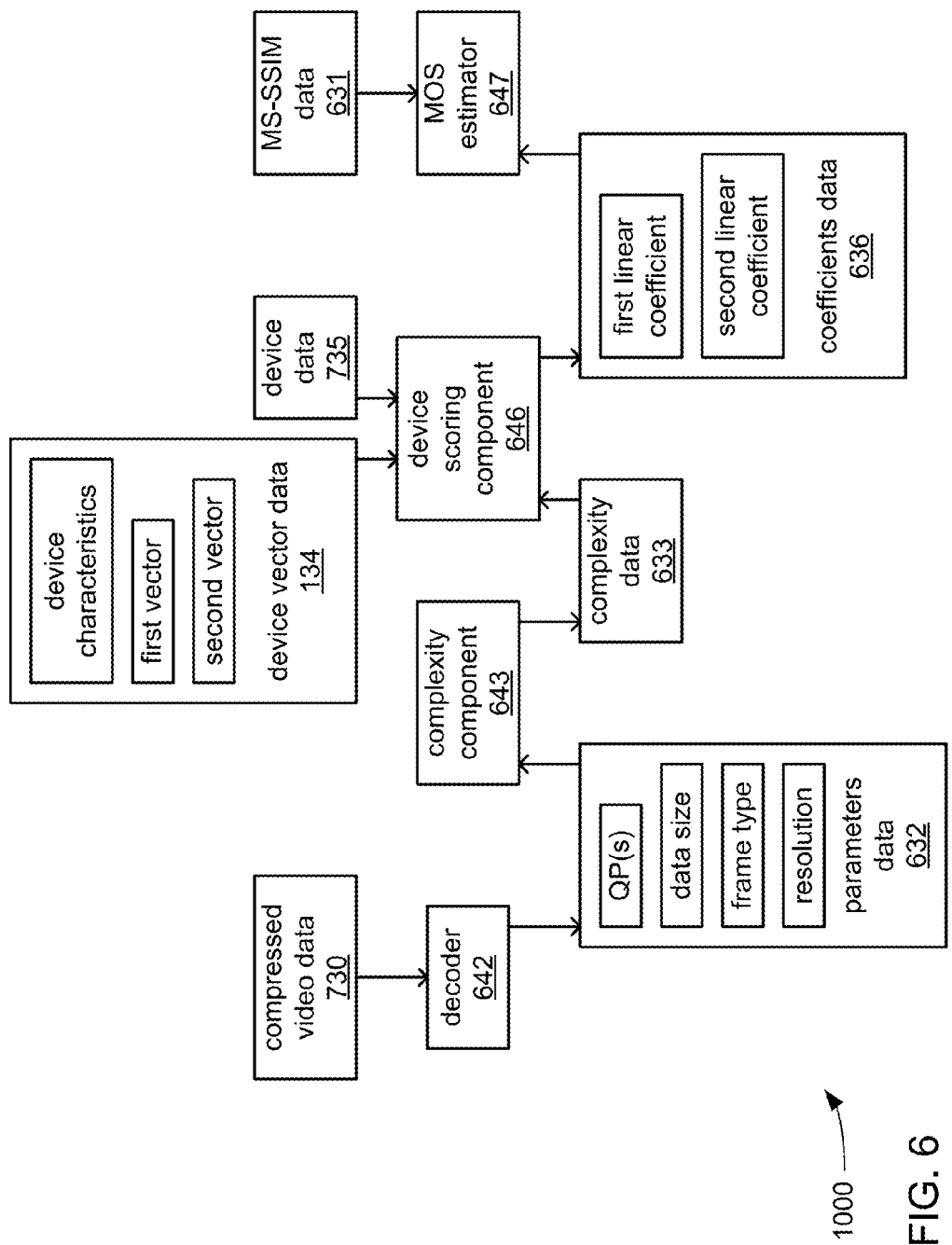
FIG. 6 illustrates an embodiment of data structures of the portion of FIG. 5.

FIG. 5 depicts an embodiment of such operation of the computing device 500 in an encoding phase in greater detail, and FIG. 6 depicts aspects of data exchanged between components and/or other portions of that embodiment during such operation in an encoding phase in greater detail. As depicted, the control routine 540 may incorporate a communications component 549, and the compressor 570 may incorporate a quantizer 577. Further, the evaluation routine 640 may incorporate one or more of a MS-SSIM component 641, a decoder 642, a complexity component 643, a device scoring component 646 and a MOS estimator 647. In executing the control routine 540 and the compressor 570, the processor component 550 may execute the communications component 549 and/or the quantizer 577, respectively. Further, in executing the evaluation routine 640, the processor component 640 may execute one or more of the components 641, 642, 643, 646 and 647.

In preparation for compressing the motion video represented by the video data 330 in uncompressed form, the communications component 549 may operate the interface 590 to receive one or more of the device vector data 134 from the training device 100, the video data 330 from the source device 300 and/or the device data 735 from the viewing device 700. Alternatively or additionally, other mechanisms including removable storage media may be employed to convey one or more of these piece of data to the computing device 500.

The compressor 570 may employ any of a variety of lossy motion video compression algorithms to compress the motion video represented by the video data 330 in uncompressed form to generate the compressed video data 730 representing the motion video in compressed form. In some embodiments, the compression algorithm may be a version of MPEG. In such embodiments, the quantizer 577 performs a quantization operation of MPEG to discard higher frequency components of each frame of the motion video after the pixel color values of each frame are transformed into coefficients in the frequency domain. As previously discussed, the degree to which those higher frequency components are discarded may be controllable by altering one or more QPs.

As compression is performed, the MS-SSIM component 641 retrieves data representing both uncompressed frames from the video data 330 and corresponding compressed frames from the compressed video data 730, and compares them in a form of signal analysis configured to model the manner in which the HVS is sensitive to structural characteristics of signals conveying light as seen by the eyes. Various studies have revealed a sensitivity to structural features of such signals that correlate to forms of distortion often caused by too aggressive a degree of lossy compression of motion video. The MS-SSIM component 641 derives structural distortion scores for each compressed frame, and stores them as the MS-SSIM data 631 for use by the MOS estimator 647.

Also as compression is performed, the decoder 642 at least partly decompresses each of the compressed frames of the compressed video data 730 representing the motion video in compressed form to derive various parameters of each compressed frame. As depicted in FIG. 4, those parameters may include one or more QPs employed in compressing each frame, the data size of each compressed frame (e.g., the size of each compressed frame in bits or bytes), the type of each frame (e.g., an intra-frame, a predicted frame or a bi-predicted frame), and/or the resolution of each frame (e.g., one or both of the horizontal and vertical resolutions in pixels). The decoder 642 stores such parameters for each compressed frame as the parameters data 632 for use by the complexity component 643.

The complexity component 643 employs the parameters of the parameters data 632 to derive a metric of spatial complexity for each of the compressed frames, and stores indications of those metrics as the complexity data 633 for use by the device scoring component 646. In some embodiments, this metric of spatial complexity SC for each intra-frame among the compressed frame is determined via the following equation:

$$SC = \left(\frac{\text{mean(data size)}}{40 \times (0.88^{mean(QP)})}\right) \times \sqrt{\text{(vertical resolution)}} \; 1080$$

In this equation, "data size" is the quantity of bits occupied by the intra-frame, QP is one of the quantization parameters employed in compression to generate intra-frame, and "vertical resolution" is the quantity of horizontal lines in the intra-frame.

It should be noted that the value 1080 by which "vertical resolution" is divided is selected to correspond to the viewing of motion videos in an environment where 1080 horizontal lines of resolution is the expected standard for "high definition" motion videos. It is envisioned that other environments are possible in which what is deemed "high definition" may entail the use of a different quantity of rows of resolution (e.g., so-called "4K" resolutions, etc.) such that a different value may be used. It should also be noted that in some embodiments, including embodiments in which the compression algorithm employed by the compressor 570 is a version of MPEG, the decoder 642 may decode only intra-frames (I-frames) and/or the complexity component 643 may derive a metric of spatial complexity only for I-frames. This may be deemed desirable based on the pixel color values of the pixels of I-frames being fully described without reference to other frames. In contrast, the pixel color values of predicted frames (P-frames) and bi-predicted frames (B-frames) are described in reference to (e.g., as differences from) the pixel color values of pixels of one or more other frames.

The device scoring component 646 retrieves at least the device vector data 134 and the complexity data 633, and uses them together to determine the first and second linear coefficients to be provided to the MOS estimator 647 as the coefficients data 636. As has been discussed, the first and second vectors conveyed in the device vector data 134 are associated with viewing devices having one or more viewing characteristics similar to those of the viewing device 70 that was earlier employed in begetting the opinion scores from which the first and second vectors of the device vector data 134 were derived. Presuming that the viewing device 700 has viewing characteristics such as display size and display resolution that are similar to those of the viewing device 70, then the first and second vectors of the device vector data 134 may properly be used in conjunction with compressing motion video for viewing via the viewing device 700.

In some embodiments, there may be multiple instances (not shown) of the device vector data 134, each associated with viewing devices having different viewing characteristics (e.g., having a display of a different size and/or different resolution). In such embodiments, the device scoring component 646 may also retrieve the device data 735 received from the viewing device 700 and providing indications of one or more viewing characteristics of the viewing device 700. The device scoring component 646 may compare the viewing characteristics of the viewing device 700 indicated in the device data 735 to device viewing characteristics specified in each of the instances of the device vector data 134 to identify the one instance of the vector data 134 associated with device characteristics that most closely match those of the viewing device 700.

For each compressed frame for which the complexity data 633 provides an indication of spatial complexity, that indication of spatial complexity is compared to the spatial complexities included in each of the first and second vectors to identify the first and second linear coefficients that correspond to the closest of those spatial complexities, and that will be provided to the MOS estimator 647 as the linear coefficients data 636 for that compressed frame. In effect, the multiple spatial complexity values included in each of the first and second vectors is employed as an index, with the spatial complexity value indicated in the complexity data 633 for that compressed frame used with that index to select the first and second linear coefficients, respectively.

The MOS estimator 647 employs the structural distortion scores of the MS-SSIM data 631 and the first and second linear coefficients of the coefficients data 636 to derive an estimated MOS for each compressed frames of the motion video as represented by the compressed video data 730. The MOS estimator 647 then employs these estimated MOSs to determine whether to signal the quantizer 577 with an indication to alter one or more QPs to increase or decrease the degree of motion video compression. More specifically, the MOS estimator 647 determines whether to signal the quantizer 577 to change the degree to which higher frequency components are discarded in generating each compressed frame.

In some embodiments, the first linear coefficient A is employed as a slope and the second linear coefficient B is employed as an offset in a linear mathematical relationship between the structural distortion scores of the MS-SSIM data 631 and the opinion scores collected during the training phase, as reflected in the first and second vectors of the device vector data 134. In such embodiments, the estimated MOS may be determined using the following equation:

(estimated MOS)=$A$×(structural distortion score)+$B$

The estimated MOS derived in this manner may then be subjected to minimum and maximum limits such that the value of the estimated MOS is modified to fall within a range of 1 to 5 if it does not already do so. In such embodiments, a value of or close to 3 for a given compressed frame may be taken as indicating that the degree to which a particular frame was compressed by execution of the compressor 570 was correct. In contrast, a value closer to one or the other of 1 or 5 for a given compressed frame may be taken as indicating that the degree of compression to be applied to generate the next compressed frame(s) is to be adjusted.

Returning to FIG. 1, in various embodiments, the viewing device 700 incorporates one or more of a processor component 750, a storage 760, a display 780 and an interface 790 to couple the viewing device 700 to the network 999. The storage 760 stores one or more of a control routine 740, the device data 735 and the compressed video data 730. The control routine 740 incorporates a sequence of instructions operative on the processor component 750 in its role as a main processor component of the viewing device 700 to implement logic to perform various functions. In executing the control routine 740 in some embodiments, the processor component 750 may operate the interface 790 to transmit the device data 735 indicating one or more viewing characteristics of the viewing device (e.g., size and/or resolution of the display 780) to the computing device 500. The processor component 750 may also operate the interface 790 to receive the compressed video data 730, may decompress it, and may visually present it on the display 780.

Figure 2:
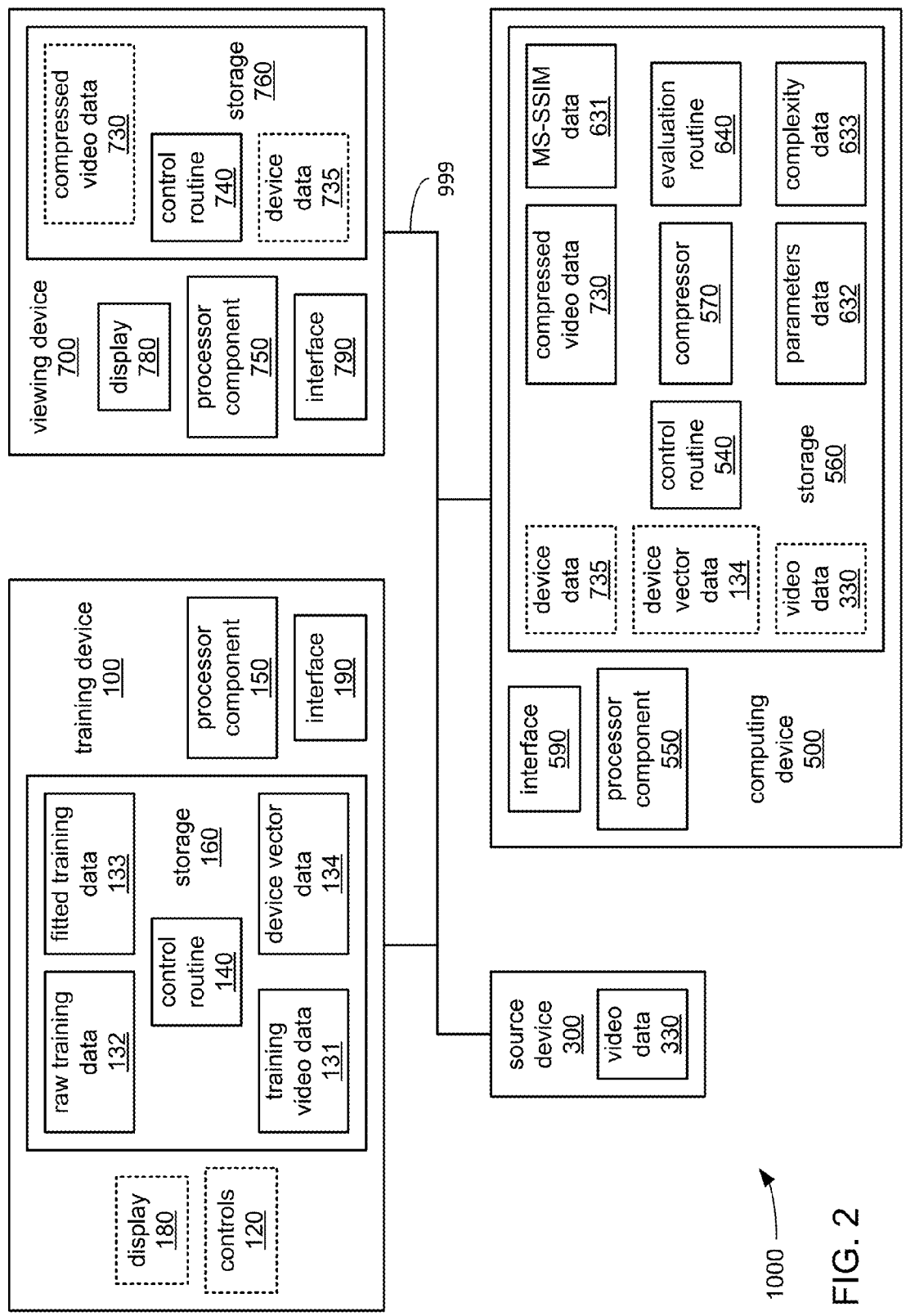
FIG. 2 illustrates an alternate embodiment of a video processing system.

FIG. 2 illustrates a block diagram of an alternate embodiment of the video processing system 1000 that includes an alternate embodiment of the computing device 500. The alternate embodiment of the video processing system 1000 of FIG. 2 is similar to the embodiment of FIG. 1 in many ways, and thus, like reference numerals are used to refer to like elements throughout. However, unlike the computing device 500 of FIG. 1, the computing device 500 of FIG. 2 does not incorporate the controller 600. Thus, unlike the computing device 500 of FIG. 1, in the computing device 500 of FIG. 2, it is the processor component 550 that executes the evaluation routine 640 in lieu of there being a processor component 650 to do so. Therefore, in the alternate embodiment of the video processing system 1000 of FIG. 2, the processor component 550 may evaluate compressed frames of the compressed video data 730 representing a motion video in compressed form as the compressed video data 730 is generated from the video data 330.

In various embodiments, each of the processor components 150, 550, 650 and 750 may include any of a wide variety of commercially available processors. Further, one or more of these processor components may include multiple processors, a multi-threaded processor, a multi-core processor (whether the multiple cores coexist on the same or separate dies), and/or a multi-processor architecture of some other variety by which multiple physically separate processors are in some way linked.

Although each of the processor components 150, 550, 650 and 750 may include any of a variety of types of processor, it is envisioned that the processor component 650 of the controller 600 (if present) may be somewhat specialized and/or optimized to perform tasks related to graphics and/or video. More broadly, it is envisioned that the controller 600 embodies a graphics subsystem of the computing device 500 to enable the performance of tasks related to graphics rendering, video compression, image resealing, etc., using components separate and distinct from the processor component 550 and its more closely related components.

In various embodiments, each of the storages 160, 560, 660 and 760 may be based on any of a wide variety of information storage technologies, possibly including volatile technologies requiring the uninterrupted provision of electric power, and possibly including technologies entailing the use of machine-readable storage media that may or may not be removable. Thus, each of these storages may include any of a wide variety of types (or combination of types) of storage device, including without limitation, read-only memory (ROM), random-access memory (RAM), dynamic RAM (DRAM), Double-Data-Rate DRAM (DDR-DRAM), synchronous DRAM (SDRAM), static RAM (SRAM), programmable ROM (PROM), erasable programmable ROM (EPROM), electrically erasable programmable ROM (EEPROM), flash memory, polymer memory (e.g., ferroelectric polymer memory), ovonic memory, phase change or ferroelectric memory, silicon-oxide-nitride-oxide-silicon (SONOS) memory, magnetic or optical cards, one or more individual ferromagnetic disk drives, or a plurality of storage devices organized into one or more arrays (e.g., multiple ferromagnetic disk drives organized into a Redundant Array of Independent Disks array, or RAID array). It should be noted that although each of these storages is depicted as a single block, one or more of these may include multiple storage devices that may be based on differing storage technologies. Thus, for example, one or more of each of these depicted storages may represent a combination of an optical drive or flash memory card reader by which programs and/or data may be stored and conveyed on some form of machine-readable storage media, a ferromagnetic disk drive to store programs and/or data locally for a relatively extended period, and one or more volatile solid state memory devices enabling relatively quick access to programs and/or data (e.g., SRAM or DRAM). It should also be noted that each of these storages may be made up of multiple storage components based on identical storage technology, but which may be maintained separately as a result of specialization in use (e.g., some DRAM devices employed as a main storage while other DRAM devices employed as a distinct frame buffer of a graphics controller).

In various embodiments, the interfaces 190, 590 and 790 may employ any of a wide variety of signaling technologies enabling these computing devices to be coupled to other devices as has been described. Each of these interfaces includes circuitry providing at least some of the requisite functionality to enable such coupling. However, each of these interfaces may also be at least partially implemented with sequences of instructions executed by corresponding ones of the processor components (e.g., to implement a protocol stack or other features). Where electrically and/or optically conductive cabling is employed, these interfaces may employ signaling and/or protocols conforming to any of a variety of industry standards, including without limitation, RS-232C, RS-422, USB, Ethernet (IEEE-802.3) or IEEE-1394. Where the use of wireless signal transmission is entailed, these interfaces may employ signaling and/or protocols conforming to any of a variety of industry standards, including without limitation, IEEE 802.11a, 802.11b, 802.11g, 802.16, 802.20 (commonly referred to as "Mobile Broadband Wireless Access"); Bluetooth; ZigBee; or a cellular radiotelephone service such as GSM with General Packet Radio Service (GSM/GPRS), CDMA/1xRTT, Enhanced Data Rates for Global Evolution (EDGE), Evolution Data Only/Optimized (EV-DO), Evolution For Data and Voice (EV-DV), High Speed Downlink Packet Access (HSDPA), High Speed Uplink Packet Access (HSUPA), 4G LTE, etc.

Figure 7:
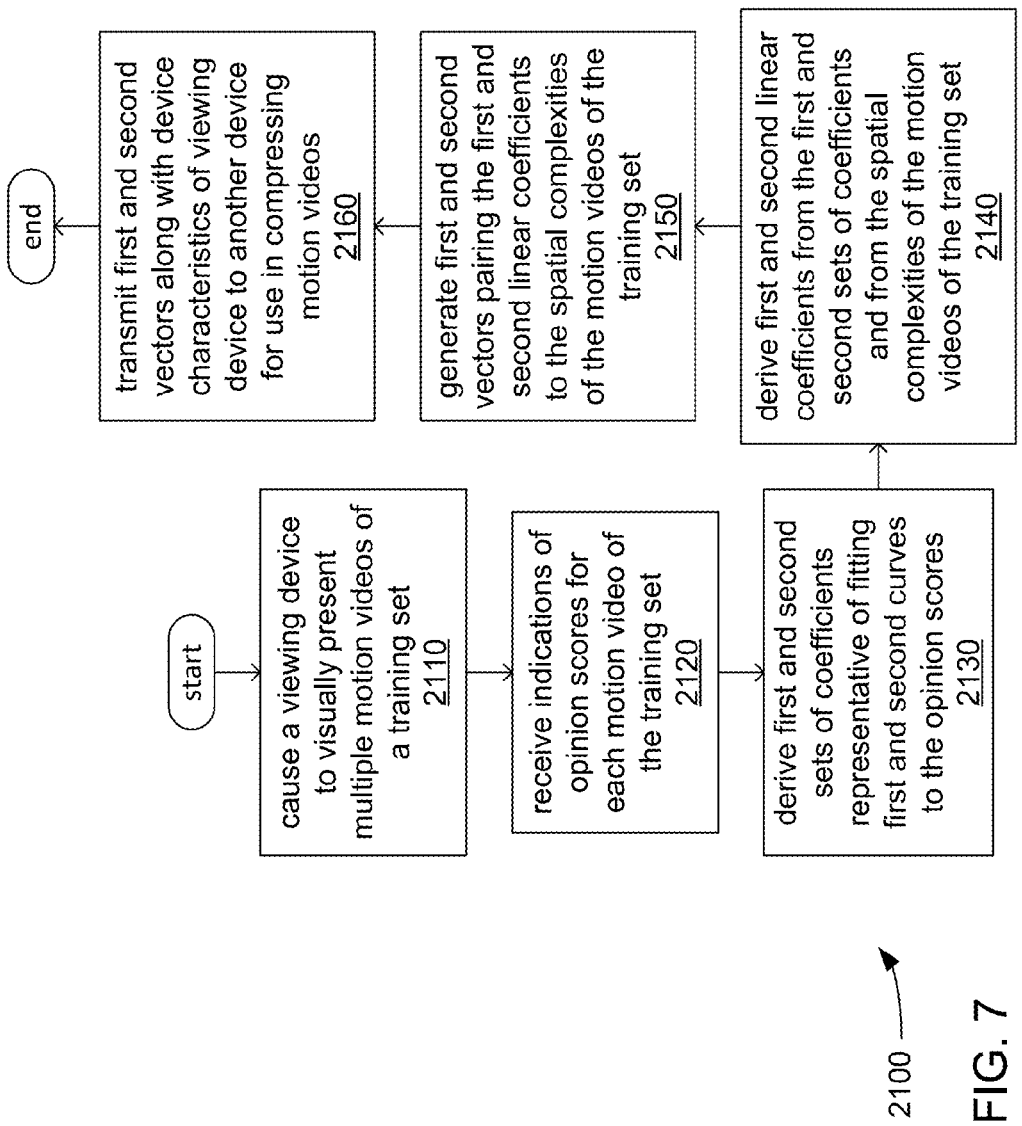
FIGS. 7-8 each illustrate a logic flow according to an embodiment.

FIG. 7 illustrates one embodiment of a logic flow 2100. The logic flow 2100 may be representative of some or all of the operations executed by one or more embodiments described herein. More specifically, the logic flow 2100 may illustrate operations performed by the processor component 150 in executing at least the control routine 140, and/or performed by other component(s) of the training device 100.

At 2110, a processor component of a training device (e.g., the processor component 150 of the training device 100) causes a viewing device to visually present multiple motion videos of a training set of motion videos. The motion videos may be transmitted to the viewing device or otherwise provided to the viewing device via such mechanisms as removable storage media (e.g., optical disk, non-volatile solid state storage devices, etc.). As previously explained, each of the motion videos may be selected based on its spatial complexity to provide the training set with a selected range of spatial complexities of a selected distribution.

At 2120, indications of opinion scores of persons viewing each of the motion videos of the training via the viewing device set are received, and are stored as raw training data. As has been discussed, the scores may be based on the numerical scoring system of values of 1 through 5 commonly used in implementing the widely known and used MOS evaluation technique.

At 2130, first and second sets of coefficients of mathematical models are derived from the opinion scores of the raw training data, the first and second sets of coefficients representing first and second curves fitted to the raw training data in such derivation. At 2140, for each of the motion videos of the training set, separate first and second linear coefficients are then derived from the first and second sets of coefficients, respectively, and from the spatial complexity of each of the motion videos.

At 2150, all of the first linear coefficients associated with each of the motion videos of the training set are paired with corresponding ones of the spatial complexities of those motion videos to form a first vector. Correspondingly, all of the second linear coefficients associated with each of those motion videos are paired with corresponding ones of those spatial complexities to form a second vector indicative. As previously discussed, the two vectors together provide an indication of the image quality achieved in using the viewing device (or another viewing device of similar viewing characteristics) to view motion videos of different spatial complexities.

At 2160, the first and second vectors are transmitted (or otherwise conveyed) to another device for use in compressing motion videos. As previously discussed, along with the first and second vectors, indications of one or more viewing characteristics of the viewing device may also be transmitted or conveyed to that other device to enable the selection of the first and second vectors, or of another pair of vectors for use in controlling the compression of another motion video based on viewing characteristics of whatever viewing device that other motion video is to be viewed with.

Figure 8:
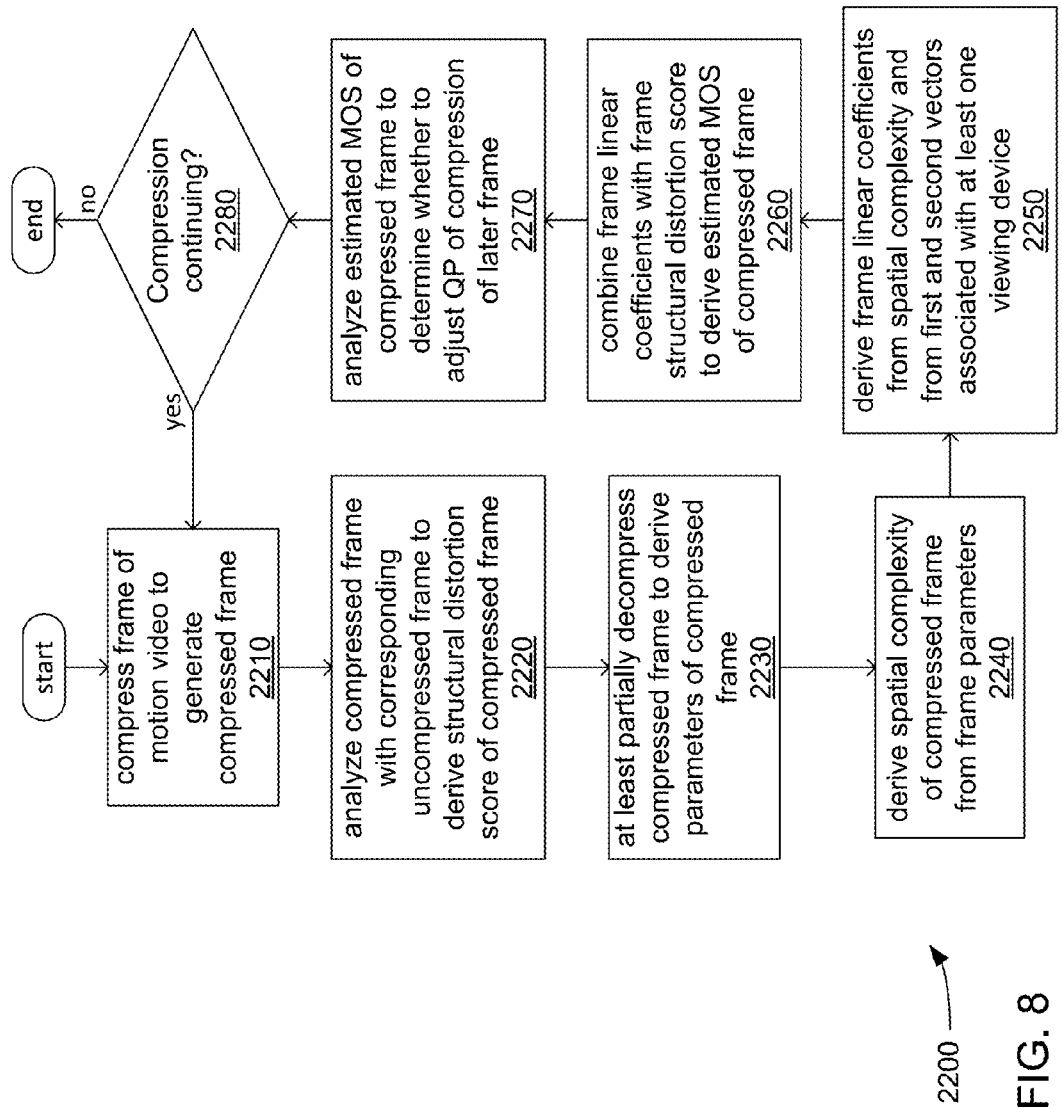

FIG. 8 illustrates one embodiment of a logic flow 2200. The logic flow 2200 may be representative of some or all of the operations executed by one or more embodiments described herein. More specifically, the logic flow 2200 may illustrate operations performed by the processor component 550 or 650 in executing at least the compressor 570 and/or the evaluation routine 640, and/or performed by other component(s) of the computing device 500 or the controller 600, respectively.

At 2210, a processor component of a computing device (e.g., either the processor component 550 of the computing device 300, or the processor component 650 of the controller 600) compresses a frame of a motion video (e.g., a frame of the motion video represented by the video data 330 in uncompressed form and by the compressed video data 730 in compressed form). As has been discussed, the type of motion video compression used is a lossy form of motion compression, and may be a version of MPEG.

At 2220, the compressed frame and the same frame in its originally uncompressed form are analyzed together to derive structural distortion score. As previously discussed, this analysis is a form of signal analysis based on treating the HVS as a system that analyzes images as signals and responds to particular structural characteristics of those signals. Further, the structural distortion value may be derived through use of MS-SSIM, a derivative of the widely known and used SSIM evaluation technique.

At 2230, the compressed frame is at least partially decompressed to derive various parameters of the compressed frame. As previously discussed, such parameters may include one or more of the data size of the compressed frame, the type of the compressed frame, the resolution of the compressed frame and a QP employed in the compression that generated the compressed frame. At 2240, these parameters are employed to derive the spatial complexity of the compressed frame.

At 2240, first and second vectors associated a viewing device (or with multiple viewing devices having similar viewing characteristics) are employed, along with the spatial complexity of the compressed frame, to derive first and second linear coefficients. As previously explained, the spatial complexity of the compressed frame is used to select the ones of the first and second linear coefficients from the first and second vectors, respectively, that are associated with a spatial complexity that is closest to the spatial complexity of the compressed frame.

At 2260, the first and second linear coefficients are used along with the structural distortion score to derive an estimated MOS of the compressed frame. As previously explained, the estimated MOS may be intended to have a value in the range of 1 through 5 in keeping with the widely known and used MOS evaluation technique, and may be adjusted to fall within that range if it does not do so as derived.

At 2270, the estimated MOS is analyzed to determine whether it indicates that at least one QP employed in compressing the motion video should be adjusted. As previously discussed, a quantizer of a motion video compressor may be signaled to adjust one or more QPs, as a result.

At 2280, a check is made as to whether the compression of the motion video is still in progress. If so, then another frame is compressed at 2210.

Figure 9:
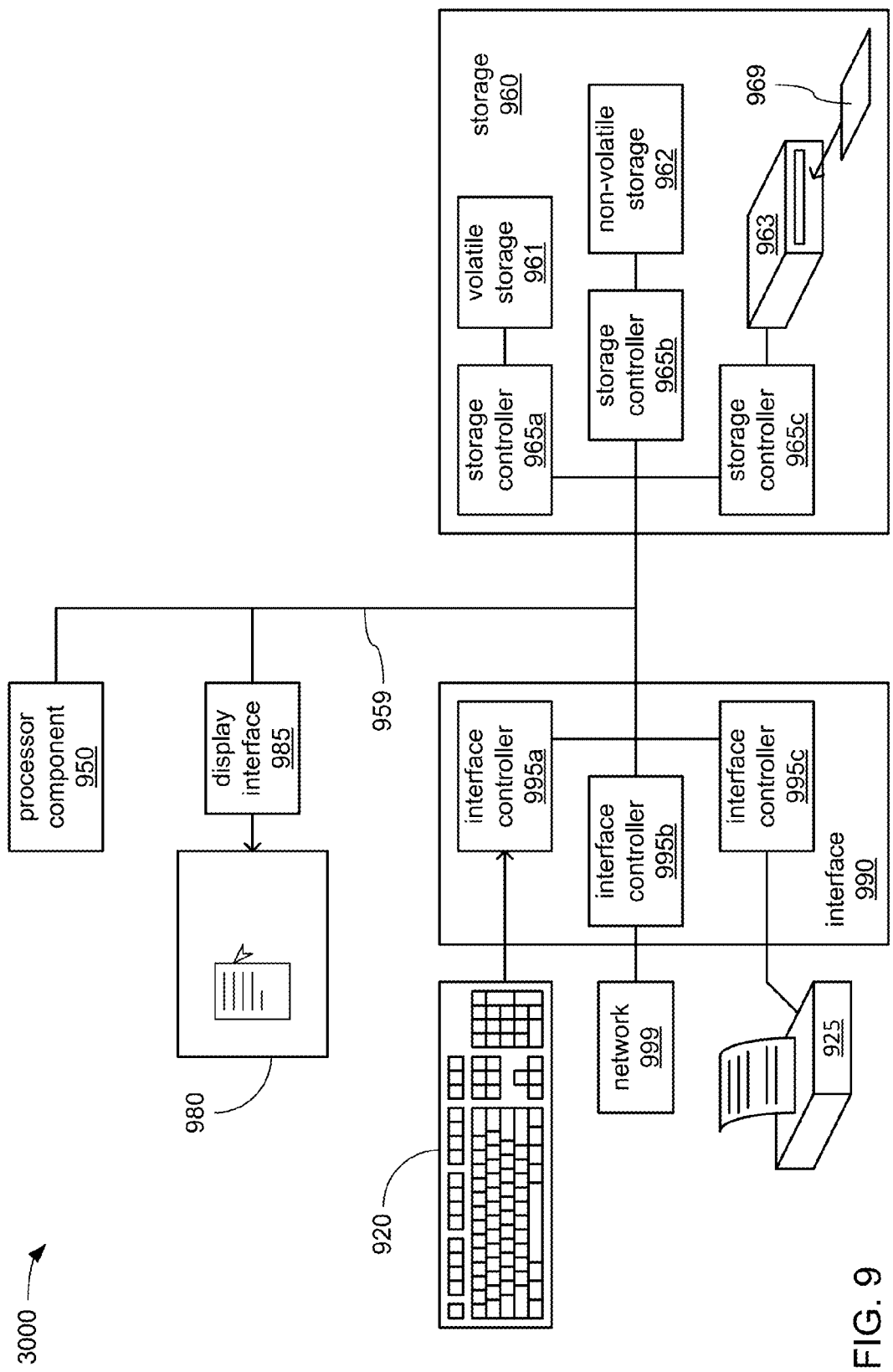
FIG. 9 illustrates a processing architecture according to an embodiment.

FIG. 9 illustrates an embodiment of an exemplary processing architecture 3000 suitable for implementing various embodiments as previously described. More specifically, the processing architecture 3000 (or variants thereof) may be implemented as part of one or more of the computing devices 100, 300, 500 or 700, and/or as part of the controller 600. It should be noted that components of the processing architecture 3000 are given reference numbers in which the last two digits correspond to the last two digits of reference numbers of at least some of the components earlier depicted and described as part of the computing devices 100, 300, 500 and 700, as well as the controller 600. This is done as an aid to correlating components of each.

The processing architecture 3000 includes various elements commonly employed in digital processing, including without limitation, one or more processors, multi-core processors, co-processors, memory units, chipsets, controllers, peripherals, interfaces, oscillators, timing devices, video cards, audio cards, multimedia input/output (I/O) components, power supplies, etc. As used in this application, the terms "system" and "component" are intended to refer to an entity of a computing device in which digital processing is carried out, that entity being hardware, a combination of hardware and software, software, or software in execution, examples of which are provided by this depicted exemplary processing architecture. For example, a component can be, but is not limited to being, a process running on a processor component, the processor component itself, a storage device (e.g., a hard disk drive, multiple storage drives in an array, etc.) that may employ an optical and/or magnetic storage medium, a software object, an executable sequence of instructions, a thread of execution, a program, and/or an entire computing device (e.g., an entire computer). By way of illustration, both an application running on a server and the server can be a component. One or more components can reside within a process and/or thread of execution, and a component can be localized on one computing device and/or distributed between two or more computing devices. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to one or more signal lines. A message (including a command, status, address or data message) may be one of such signals or may be a plurality of such signals, and may be transmitted either serially or substantially in parallel through any of a variety of connections and/or interfaces.

As depicted, in implementing the processing architecture 3000, a computing device includes at least a processor component 950, a storage 960, an interface 990 to other devices, and a coupling 959. As will be explained, depending on various aspects of a computing device implementing the processing architecture 3000, including its intended use and/or conditions of use, such a computing device may further include additional components, such as without limitation, a display interface 985.

The coupling 959 includes one or more buses, point-to-point interconnects, transceivers, buffers, crosspoint switches, and/or other conductors and/or logic that communicatively couples at least the processor component 950 to the storage 960. Coupling 959 may further couple the processor component 950 to one or more of the interface 990, the audio subsystem 970 and the display interface 985 (depending on which of these and/or other components are also present). With the processor component 950 being so coupled by couplings 959, the processor component 950 is able to perform the various ones of the tasks described at length, above, for whichever one(s) of the aforedescribed computing devices implement the processing architecture 3000. Coupling 959 may be implemented with any of a variety of technologies or combinations of technologies by which signals are optically and/or electrically conveyed. Further, at least portions of couplings 959 may employ timings and/or protocols conforming to any of a wide variety of industry standards, including without limitation, Accelerated Graphics Port (AGP), CardBus, Extended Industry Standard Architecture (E-ISA), Micro Channel Architecture (MCA), NuBus, Peripheral Component Interconnect (Extended) (PCI-X), PCI Express (PCI-E), Personal Computer Memory Card International Association (PCMCIA) bus, HyperTransport™, QuickPath, and the like.

As previously discussed, the processor component 950 (corresponding to the processor components 150, 550, 650 and 750) may include any of a wide variety of commercially available processors, employing any of a wide variety of technologies and implemented with one or more cores physically combined in any of a number of ways.

As previously discussed, the storage 960 (corresponding to the storages 160, 560, 660 and 760) may be made up of one or more distinct storage devices based on any of a wide variety of technologies or combinations of technologies. More specifically, as depicted, the storage 960 may include one or more of a volatile storage 961 (e.g., solid state storage based on one or more forms of RAM technology), a non-volatile storage 962 (e.g., solid state, ferromagnetic or other storage not requiring a constant provision of electric power to preserve their contents), and a removable media storage 963 (e.g., removable disc or solid state memory card storage by which information may be conveyed between computing devices). This depiction of the storage 960 as possibly including multiple distinct types of storage is in recognition of the commonplace use of more than one type of storage device in computing devices in which one type provides relatively rapid reading and writing capabilities enabling more rapid manipulation of data by the processor component 950 (but possibly using a "volatile" technology constantly requiring electric power) while another type provides relatively high density of non-volatile storage (but likely provides relatively slow reading and writing capabilities).

Given the often different characteristics of different storage devices employing different technologies, it is also commonplace for such different storage devices to be coupled to other portions of a computing device through different storage controllers coupled to their differing storage devices through different interfaces. By way of example, where the volatile storage 961 is present and is based on RAM technology, the volatile storage 961 may be communicatively coupled to coupling 959 through a storage controller 965a providing an appropriate interface to the volatile storage 961 that perhaps employs row and column addressing, and where the storage controller 965a may perform row refreshing and/or other maintenance tasks to aid in preserving information stored within the volatile storage 961. By way of another example, where the non-volatile storage 962 is present and includes one or more ferromagnetic and/or solid-state disk drives, the non-volatile storage 962 may be communicatively coupled to coupling 959 through a storage controller 965b providing an appropriate interface to the non-volatile storage 962 that perhaps employs addressing of blocks of information and/or of cylinders and sectors. By way of still another example, where the removable media storage 963 is present and includes one or more optical and/or solid-state disk drives employing one or more pieces of machine-readable storage medium 969, the removable media storage 963 may be communicatively coupled to coupling 959 through a storage controller 965c providing an appropriate interface to the removable media storage 963 that perhaps employs addressing of blocks of information, and where the storage controller 965c may coordinate read, erase and write operations in a manner specific to extending the lifespan of the machine-readable storage medium 969.

One or the other of the volatile storage 961 or the non-volatile storage 962 may include an article of manufacture in the form of a machine-readable storage media on which a routine including a sequence of instructions executable by the processor component 950 may be stored, depending on the technologies on which each is based. By way of example, where the non-volatile storage 962 includes ferromagnetic-based disk drives (e.g., so-called "hard drives"), each such disk drive typically employs one or more rotating platters on which a coating of magnetically responsive particles is deposited and magnetically oriented in various patterns to store information, such as a sequence of instructions, in a manner akin to storage medium such as a floppy diskette. By way of another example, the non-volatile storage 962 may be made up of banks of solid-state storage devices to store information, such as sequences of instructions, in a manner akin to a compact flash card. Again, it is commonplace to employ differing types of storage devices in a computing device at different times to store executable routines and/or data.

Thus, a routine including a sequence of instructions to be executed by the processor component 950 may initially be stored on the machine-readable storage medium 969, and the removable media storage 963 may be subsequently employed in copying that routine to the non-volatile storage 962 for longer term storage not requiring the continuing presence of the machine-readable storage medium 969 and/or the volatile storage 961 to enable more rapid access by the processor component 950 as that routine is executed.

As previously discussed, the interface 990 (possibly corresponding to the interfaces 190, 590 or 790) may employ any of a variety of signaling technologies corresponding to any of a variety of communications technologies that may be employed to communicatively couple a computing device to one or more other devices. Again, one or both of various forms of wired or wireless signaling may be employed to enable the processor component 950 to interact with input/output devices (e.g., the depicted example keyboard 920 or printer 925) and/or other computing devices, possibly through a network (e.g., the network 999) or an interconnected set of networks. In recognition of the often greatly different character of multiple types of signaling and/or protocols that must often be supported by any one computing device, the interface 990 is depicted as including multiple different interface controllers 995a, 995b and 995c. The interface controller 995a may employ any of a variety of types of wired digital serial interface or radio frequency wireless interface to receive serially transmitted messages from user input devices, such as the depicted keyboard 920. The interface controller 995b may employ any of a variety of cabling-based or wireless signaling, timings and/or protocols to access other computing devices through the depicted network 999 (perhaps a network made up of one or more links, smaller networks, or perhaps the Internet). The interface 995c may employ any of a variety of electrically conductive cabling enabling the use of either serial or parallel signal transmission to convey data to the depicted printer 925. Other examples of devices that may be communicatively coupled through one or more interface controllers of the interface 990 include, without limitation, a microphone to monitor sounds of persons to accept commands and/or data signaled by those persons via voice or other sounds they may make, remote controls, stylus pens, card readers, finger print readers, virtual reality interaction gloves, graphical input tablets, joysticks, other keyboards, retina scanners, the touch input component of touch screens, trackballs, various sensors, a camera or camera array to monitor movement of persons to accept commands and/or data signaled by those persons via gestures and/or facial expressions, laser printers, inkjet printers, mechanical robots, milling machines, etc.

Where a computing device is communicatively coupled to (or perhaps, actually incorporates) a display (e.g., the depicted example display 980), such a computing device implementing the processing architecture 3000 may also include the display interface 985. Although more generalized types of interface may be employed in communicatively coupling to a display, the somewhat specialized additional processing often required in visually displaying various forms of content on a display, as well as the somewhat specialized nature of the cabling-based interfaces used, often makes the provision of a distinct display interface desirable. Wired and/or wireless signaling technologies that may be employed by the display interface 985 in a communicative coupling of the display 980 may make use of signaling and/or protocols that conform to any of a variety of industry standards, including without limitation, any of a variety of analog video interfaces, Digital Video Interface (DVI), DisplayPort, etc.

Figure 10:
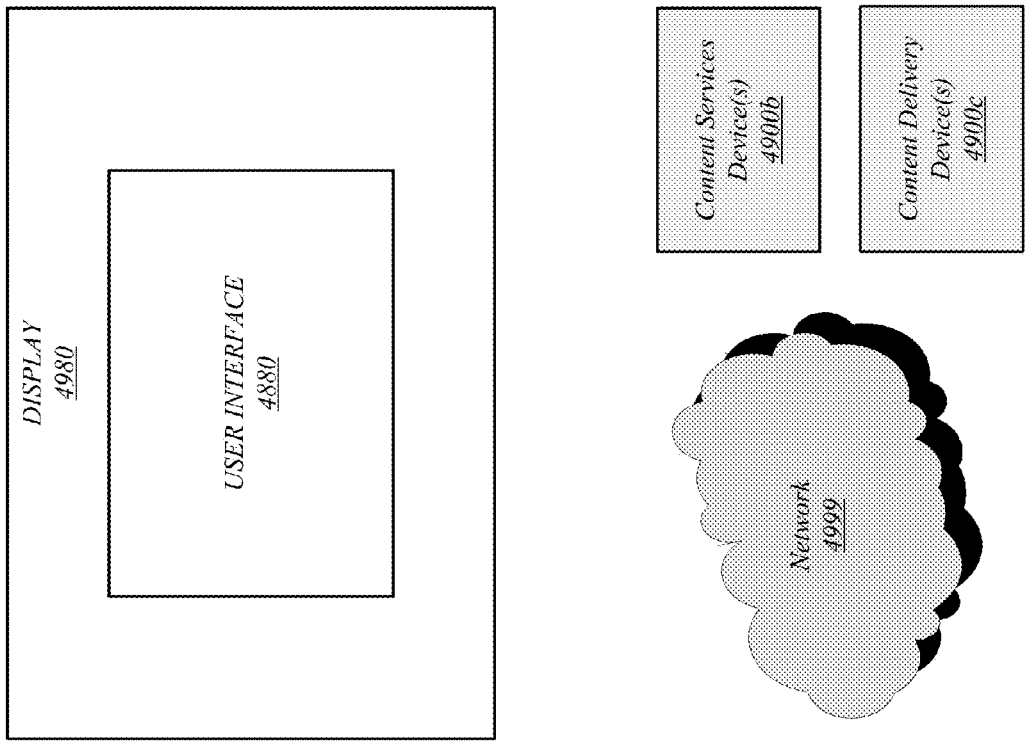
FIG. 10 illustrates another alternate embodiment of a graphics processing system.
Figure 10:
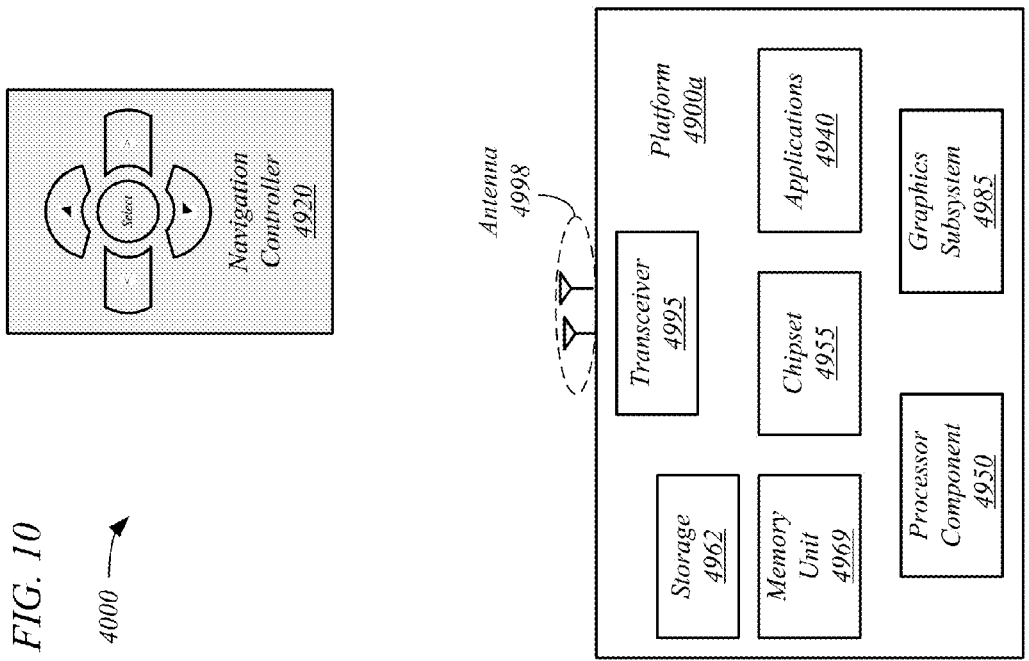

FIG. 10 illustrates an embodiment of a system 4000. In various embodiments, system 4000 may be representative of a system or architecture suitable for use with one or more embodiments described herein, such as the graphics processing system 1000; one or more of the computing devices 100, 500 or 700; and/or one or more of the logic flows 2100 or 2200. The embodiments are not limited in this respect.

As shown, system 4000 may include multiple elements. One or more elements may be implemented using one or more circuits, components, registers, processors, software subroutines, modules, or any combination thereof, as desired for a given set of design or performance constraints. Although FIG. 10 shows a limited number of elements in a certain topology by way of example, it can be appreciated that more or less elements in any suitable topology may be used in system 4000 as desired for a given implementation. The embodiments are not limited in this context.

In embodiments, system 4000 may be a media system although system 4000 is not limited to this context. For example, system 4000 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In embodiments, system 4000 includes a platform 4900a coupled to a display 4980. Platform 4900a may receive content from a content device such as content services device(s) 4900c or content delivery device(s) 4900d or other similar content sources. A navigation controller 4920 including one or more navigation features may be used to interact with, for example, platform 4900a and/or display 4980. Each of these components is described in more detail below.

In embodiments, platform 4900a may include any combination of a processor component 4950, chipset 4955, memory unit 4969, transceiver 4995, storage 4962, applications 4940, and/or graphics subsystem 4985. Chipset 4955 may provide intercommunication among processor circuit 4950, memory unit 4969, transceiver 4995, storage 4962, applications 4940, and/or graphics subsystem 4985. For example, chipset 4955 may include a storage adapter (not depicted) capable of providing intercommunication with storage 4962.

Processor component 4950 may be implemented using any processor or logic device, and may be the same as or similar to one or more of processor components 150, 550, 650 or 750, and/or to processor component 950 of FIG. 9.

Memory unit 4969 may be implemented using any machine-readable or computer-readable media capable of storing data, and may be the same as or similar to storage media 969 of FIG. 9.

Transceiver 4995 may include one or more radios capable of transmitting and receiving signals using various suitable wireless communications techniques, and may be the same as or similar to transceiver 995b in FIG. 9.

Display 4980 may include any television type monitor or display, and may be the same as or similar to one or more of displays 380 and 680, and/or to display 980 in FIG. 9.

Storage 4962 may be implemented as a non-volatile storage device, and may be the same as or similar to non-volatile storage 962 in FIG. 9.

Graphics subsystem 4985 may perform processing of images such as still or video for display. Graphics subsystem 4985 may be a graphics processing unit (GPU) or a visual processing unit (VPU), for example. An analog or digital interface may be used to communicatively couple graphics subsystem 4985 and display 4980. For example, the interface may be any of a High-Definition Multimedia Interface, DisplayPort, wireless HDMI, and/or wireless HD compliant techniques. Graphics subsystem 4985 could be integrated into processor circuit 4950 or chipset 4955. Graphics subsystem 4985 could be a stand-alone card communicatively coupled to chipset 4955.

The graphics and/or video processing techniques described herein may be implemented in various hardware architectures. For example, graphics and/or video functionality may be integrated within a chipset. Alternatively, a discrete graphics and/or video processor may be used. As still another embodiment, the graphics and/or video functions may be implemented by a general purpose processor, including a multi-core processor. In a further embodiment, the functions may be implemented in a consumer electronics device.

In embodiments, content services device(s) 4900b may be hosted by any national, international and/or independent service and thus accessible to platform 4900a via the Internet, for example. Content services device(s) 4900b may be coupled to platform 4900a and/or to display 4980. Platform 4900a and/or content services device(s) 4900b may be coupled to a network 4999 to communicate (e.g., send and/or receive) media information to and from network 4999. Content delivery device(s) 4900c also may be coupled to platform 4900a and/or to display 4980.

In embodiments, content services device(s) 4900b may include a cable television box, personal computer, network, telephone, Internet enabled devices or appliance capable of delivering digital information and/or content, and any other similar device capable of unidirectionally or bidirectionally communicating content between content providers and platform 4900a and/display 4980, via network 4999 or directly. It will be appreciated that the content may be communicated unidirectionally and/or bidirectionally to and from any one of the components in system 4000 and a content provider via network 4999. Examples of content may include any media information including, for example, video, music, medical and gaming information, and so forth.

Content services device(s) 4900b receives content such as cable television programming including media information, digital information, and/or other content. Examples of content providers may include any cable or satellite television or radio or Internet content providers. The provided examples are not meant to limit embodiments.

In embodiments, platform 4900a may receive control signals from navigation controller 4920 having one or more navigation features. The navigation features of navigation controller 4920 may be used to interact with a user interface 4880, for example. In embodiments, navigation controller 4920 may be a pointing device that may be a computer hardware component (specifically human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of navigation controller 4920 may be echoed on a display (e.g., display 4980) by movements of a pointer, cursor, focus ring, or other visual indicators displayed on the display. For example, under the control of software applications 4940, the navigation features located on navigation controller 4920 may be mapped to virtual navigation features displayed on user interface 4880. In embodiments, navigation controller 4920 may not be a separate component but integrated into platform 4900a and/or display 4980. Embodiments, however, are not limited to the elements or in the context shown or described herein.

In embodiments, drivers (not shown) may include technology to enable users to instantly turn on and off platform 4900a like a television with the touch of a button after initial boot-up, when enabled, for example. Program logic may allow platform 4900a to stream content to media adaptors or other content services device(s) 4900b or content delivery device(s) 4900c when the platform is turned "off." In addition, chip set 4955 may include hardware and/or software support for 5.1 surround sound audio and/or high definition 7.1 surround sound audio, for example. Drivers may include a graphics driver for integrated graphics platforms. In embodiments, the graphics driver may include a peripheral component interconnect (PCI) Express graphics card.

In various embodiments, any one or more of the components shown in system 4000 may be integrated. For example, platform 4900a and content services device(s) 4900b may be integrated, or platform 4900a and content delivery device(s) 4900c may be integrated, or platform 4900a, content services device(s) 4900b, and content delivery device(s) 4900c may be integrated, for example. In various embodiments, platform 4900a and display 4890 may be an integrated unit. Display 4980 and content service device(s) 4900b may be integrated, or display 4980 and content delivery device(s) 4900c may be integrated, for example. These examples are not meant to limit embodiments.

In various embodiments, system 4000 may be implemented as a wireless system, a wired system, or a combination of both. When implemented as a wireless system, system 4000 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 4000 may include components and interfaces suitable for communicating over wired communications media, such as I/O adapters, physical connectors to connect the I/O adapter with a corresponding wired communications medium, a network interface card (NIC), disc controller, video controller, audio controller, and so forth. Examples of wired communications media may include a wire, cable, metal leads, printed circuit board (PCB), backplane, switch fabric, semiconductor material, twisted-pair wire, co-axial cable, fiber optics, and so forth.

Platform 4900a may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 10.

Figure 11:
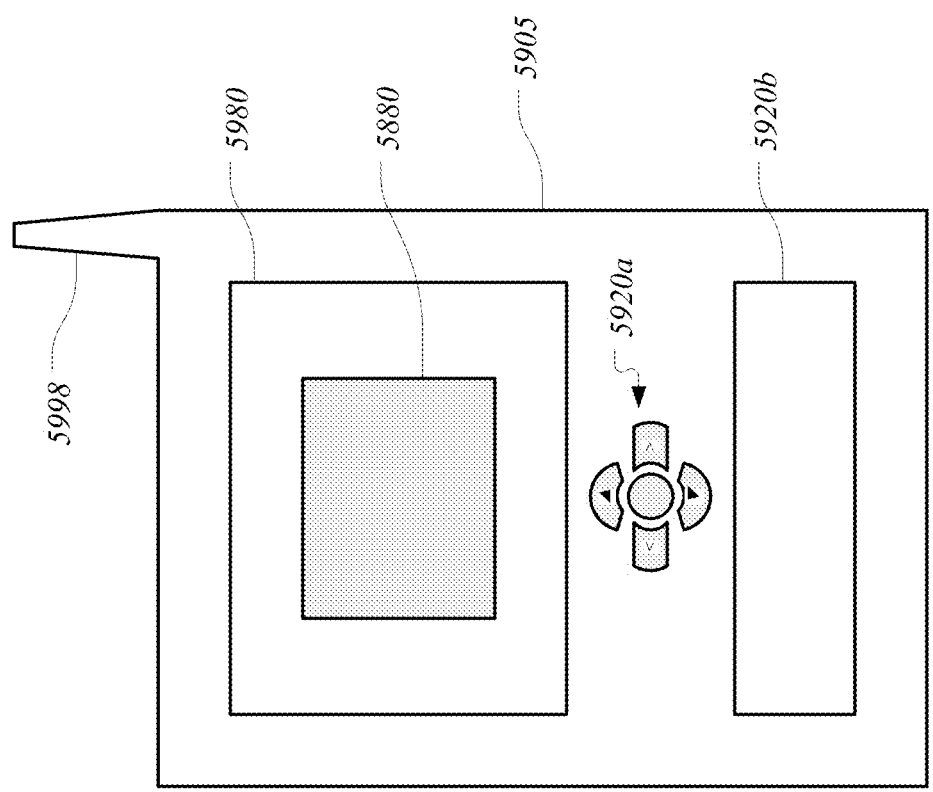
FIG. 11 illustrates an embodiment of a device.

As described above, system 4000 may be embodied in varying physical styles or form factors. FIG. 11 illustrates embodiments of a small form factor device 5000 in which system 4000 may be embodied. In embodiments, for example, device 5000 may be implemented as a mobile computing device having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 11, device 5000 may include a display 5980, a navigation controller 5920a, a user interface 5880, a housing 5905, an I/O device 5920b, and an antenna 5998. Display 5980 may include any suitable display unit for displaying information appropriate for a mobile computing device, and may be the same as or similar to display 4980 in FIG. 10. Navigation controller 5920a may include one or more navigation features which may be used to interact with user interface 5880, and may be the same as or similar to navigation controller 4920 in FIG. 10. I/O device 5920b may include any suitable I/O device for entering information into a mobile computing device. Examples for I/O device 5920b may include an alphanumeric keyboard, a numeric keypad, a touch pad, input keys, buttons, switches, rocker switches, microphones, speakers, voice recognition device and software, and so forth. Information also may be entered into device 5000 by way of a microphone. Such information may be digitized by a voice recognition device. The embodiments are not limited in this context.

More generally, the various elements of the computing devices described and depicted herein may include various hardware elements, software elements, or a combination of both. Examples of hardware elements may include devices, logic devices, components, processors, microprocessors, circuits, processor components, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. However, determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other. Furthermore, aspects or elements from different embodiments may be combined.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. The detailed disclosure now turns to providing examples that pertain to further embodiments. The examples provided below are not intended to be limiting.

In Example 1, a device to compress motion video includes a compressor to compress a first uncompressed frame of a motion video to generate a first compressed frame of the motion video for a viewing device having at least one viewing characteristic, and a mean opinion score (MOS) estimator to combine a structural metric of image quality of the first compressed frame and an opinion metric of image quality associated with the at least one viewing characteristic to determine whether to alter a quantization parameter (QP) of the compressor to compress a second uncompressed frame of the motion video.

In Example 2, which includes the subject matter of Example 1, the device may include a decoder to decompress the first compressed frame to derive at least one parameter of the first compressed frame, the at least one parameter including at least one of a QP employed by the compressor to generate the first compressed frame, a resolution of the first compressed frame, a type of the first compressed frame or a data size of the first compressed frame.

In Example 3, which includes the subject matter of any of Examples 1-2, the device may include a complexity component to derive a spatial complexity of the first compressed frame from the at least one parameter.

In Example 4, which includes the subject matter of any of Examples 1-3, the device may include a device scoring component to employ the spatial complexity of the first compressed frame to select at least one linear coefficient from at least one vector correlating spatial complexity values to linear coefficients, and the opinion metric of image quality associated with the at least one viewing characteristic may include the at least one linear coefficient.

In Example 5, which includes the subject matter of any of Examples 1-4, the device may include an interface to receive the at least one vector from another device.

In Example 6, which includes the subject matter of any of Examples 1-5, the device may include a training component to derive the at least one vector from opinion scores associated with viewing multiple motion videos of a training set of motion videos using another viewing device having the at least one viewing characteristic.

In Example 7, which includes the subject matter of any of Examples 1-6, the device may include a multi-scale structural similarity (MS-SSIM) component to analyze the first uncompressed frame and first compressed frame together to derive the structural metric of image quality of the first compressed frame.

In Example 8, which includes the subject matter of any of Examples 1-7, the compressor may include a quantization component to quantize frequency domain coefficients associated with the second uncompressed frame according to the QP to generate a second compressed frame.

In Example 9, which includes the subject matter of any of Examples 1-8, the at least one viewing characteristic may include at least one of a display size, a display resolution or a viewing distance.

In Example 10, which includes the subject matter of any of Examples 1-9, the device may include an interface to transmit the motion video in a compressed form that includes the first and second compressed frames to the viewing device.

In Example 11, a device to compress motion video includes a curve fitting component to derive from raw data at least one mathematical model correlating a range of spatial complexities to a range of opinion scores associated with a viewing device having at least one viewing characteristic, the raw data including opinion scores collected from using the viewing device to view multiple motion videos of different spatial complexities of a training set of motion videos; and a non-linear fitting component to derive at least one vector correlating spatial complexity values to linear coefficients associated with the at least one viewing characteristic.

In Example 12, which includes the subject matter of Example 11, the device may include a collection component to monitor controls for an indication of operation of the controls to provide at least one of the opinion scores.

In Example 13, which includes the subject matter of any of Examples 11-12, the collection component to provide the multiple motion videos to the viewing device.

In Example 14, which includes the subject matter of any of Examples 11-13, the multiple motion videos of the training set selected to provide the training set with a selected range of spatial complexities with a selected distribution of spatial complexities.

In Example 15, which includes the subject matter of any of Examples 11-14, the at least one viewing characteristic may include at least one of a display size, a display resolution or a viewing distance.

In Example 16, which includes the subject matter of any of Examples 11-15, the device may include interface to transmit the at least one vector to another device to enable the other device to use the at least one vector with a structural metric of image quality of compression of another motion video to control compression of the other motion video for another viewing device having the at least one viewing characteristic.

In Example 17, a computing-implemented method for compressing motion video includes compressing a first uncompressed frame of a motion video to generate a first compressed frame of the motion video for a viewing device having at least one viewing characteristic, combining a structural metric of image quality of the first compressed frame and an opinion metric of image quality associated with the at least one viewing characteristic to derive an estimated mean opinion score (MOS), and determining whether to alter a quantization parameter (QP) to compress a second uncompressed frame of the motion video based on the estimated MOS.

In Example 18, which includes the subject matter of Example 17, the method may include decompressing the first compressed frame to derive at least one parameter of the first compressed frame, and the at least one parameter may include at least one of a QP employed in generating the first compressed frame, a resolution of the first compressed frame, a type of the first compressed frame or a data size of the first compressed frame.

In Example 19, which includes the subject matter of any of Examples 17-18, the method may include deriving a spatial complexity of the first compressed frame from the at least one parameter.

In Example 20, which includes the subject matter of any of Examples 17-19, the method may include employing the spatial complexity of the first compressed frame to select at least one linear coefficient from at least one vector correlating spatial complexity values to linear coefficients, and the opinion metric of image quality associated with the at least one viewing characteristic may include the at least one linear coefficient.

In Example 21, which includes the subject matter of any of Examples 17-20, the method may include receiving the at least one vector from another device.

In Example 22, which includes the subject matter of any of Examples 17-21, the method may include deriving the at least one vector from opinion scores associated with viewing multiple motion videos of a training set of motion videos using another viewing device having the at least one viewing characteristic.

In Example 23, which includes the subject matter of any of Examples 17-22, the method may include analyzing the first uncompressed frame and first compressed frame together to derive the structural metric of image quality of the first compressed frame.

In Example 24, which includes the subject matter of any of Examples 17-23, the method may include quantizing frequency domain coefficients associated with the second uncompressed frame according to the QP to generate a second compressed frame.

In Example 25, which includes the subject matter of any of Examples 17-24, the at least one viewing characteristic may include at least one of a display size, a display resolution or a viewing distance.

In Example 26, which includes the subject matter of any of Examples 17-25, the method may include transmitting the motion video in a compressed form that includes the first and second compressed frames to the viewing device.

In Example 27, at least one machine-readable storage medium includes instructions that when executed by a computing device, cause the computing device to compress a first uncompressed frame of a motion video to generate a first compressed frame of the motion video for a viewing device of at least one viewing characteristic, combine a structural metric of image quality of the first compressed frame and an opinion metric of image quality associated with the at least one viewing characteristic to derive an estimated mean opinion score (MOS), and determine whether to alter a quantization parameter (QP) to compress a second uncompressed frame of the motion video based on the estimated MOS.

In Example 28, which includes the subject matter of Example 27, the computing device may be caused to decompress the first compressed frame to derive at least one parameter of the first compressed frame, and the at least one parameter may include at least one of a QP employed in generating the first compressed frame, a resolution of the first compressed frame, a type of the first compressed frame or a data size of the first compressed frame.

In Example 29, which includes the subject matter of any of Examples 27-28, the computing device may be caused to derive a spatial complexity of the first compressed frame from the at least one parameter.

In Example 30, which includes the subject matter of any of Examples 27-29, the computing device may be caused to employ the spatial complexity of the first compressed frame to select at least one linear coefficient from at least one vector correlating spatial complexity values to linear coefficients, and the opinion metric of image quality associated with the at least one viewing characteristic may include the at least one linear coefficient.

In Example 31, which includes the subject matter of any of Examples 27-30, the computing device may be caused to receive the at least one vector from another device.

In Example 32, which includes the subject matter of any of Examples 27-31, the computing device may be caused to derive the at least one vector from opinion scores associated with viewing multiple motion videos of a training set of motion videos using another viewing device having the at least one viewing characteristic.

In Example 33, which includes the subject matter of any of Examples 27-32, the computing device may be caused to analyze the first uncompressed frame and first compressed frame together to derive the structural metric of image quality of the first compressed frame.

In Example 34, which includes the subject matter of any of Examples 27-33, the computing device may be caused to quantize frequency domain coefficients associated with the second uncompressed frame according to the QP to generate a second compressed frame.

In Example 35, which includes the subject matter of any of Examples 27-34, the at least one viewing characteristic may include at least one of a display size, a display resolution or a viewing distance.

In Example 36, which includes the subject matter of any of Examples 27-35, the computing device may be caused to transmit the motion video in a compressed form that includes the first and second compressed frames to the viewing device.

In Example 37, at least one machine-readable storage medium may include instructions that when executed by a computing device, cause the computing device to perform any of the above.

In Example 38, a device to compress motion may include means for performing any of the above.

The invention claimed is:

1. A device comprising:
a compressor to compress a first uncompressed frame of a motion video to generate a first compressed frame of the motion video for a viewing device having at least one viewing characteristic; and
a mean opinion score (MOS) estimator to combine a structural metric of image quality of the first compressed frame and an opinion metric of image quality associated with the at least one viewing characteristic to determine whether to alter a quantization parameter (QP) of the compressor to compress a second uncompressed frame of the motion video.

2. The device of claim 1, comprising a decoder to decompress the first compressed frame to derive at least one parameter of the first compressed frame, the at least one parameter comprising at least one of a QP employed by the compressor to generate the first compressed frame, a resolution of the first compressed frame, a type of the first compressed frame or a data size of the first compressed frame.

3. The device of claim 2, comprising a complexity component to derive a spatial complexity of the first compressed frame from the at least one parameter.

4. The device of claim 3, comprising a device scoring component to employ the spatial complexity of the first compressed frame to select at least one linear coefficient from at least one vector correlating spatial complexity values to linear coefficients, the opinion metric of image quality associated with the at least one viewing characteristic comprising the at least one linear coefficient.

5. The device of claim 4, comprising a training component to derive the at least one vector from opinion scores associated with viewing multiple motion videos of a training set of motion videos using another viewing device having the at least one viewing characteristic.

6. The device of claim 1, comprising a multi-scale structural similarity (MS-SSIM) component to analyze the first uncompressed frame and first compressed frame together to derive the structural metric of image quality of the first compressed frame.

7. The device of claim 1, comprising an interface to transmit the motion video in a compressed form comprising the first and second compressed frames to the viewing device.

8. A device comprising:
a curve fitting component to derive from raw data at least one mathematical model correlating a range of spatial complexities to a range of opinion scores associated with a viewing device having at least one viewing characteristic, the raw data comprising opinion scores collected from using the viewing device to view multiple motion videos of different spatial complexities of a training set of motion videos; and
a non-linear fitting component to derive at least one vector correlating spatial complexity values to linear coefficients associated with the at least one viewing characteristic.

9. The device of claim 8, comprising a collection component to monitor controls for an indication of operation of the controls to provide at least one of the opinion scores.

10. The device of claim 9, the collection component to provide the multiple motion videos to the viewing device.

11. The device of claim 8, the multiple motion videos of the training set selected to provide the training set with a selected range of spatial complexities with a selected distribution of spatial complexities.

12. The device of claim 8, comprising an interface to transmit the at least one vector to another device to enable the other device to use the at least one vector with a structural metric of image quality of compression of another motion video to control compression of the other motion video for another viewing device having the at least one viewing characteristic.

13. A computer-implemented method comprising:
compressing a first uncompressed frame of a motion video to generate a first compressed frame of the motion video for a viewing device having at least one viewing characteristic;
combining a structural metric of image quality of the first compressed frame and an opinion metric of image quality associated with the at least one viewing characteristic to derive an estimated mean opinion score (MOS); and
determining whether to alter a quantization parameter (QP) to compress a second uncompressed frame of the motion video based on the estimated MOS.

14. The computer-implemented method of claim 13, the method comprising decompressing the first compressed frame to derive at least one parameter of the first compressed frame, the at least one parameter comprising at least one of a QP employed in generating the first compressed frame, a resolution of the first compressed frame, a type of the first compressed frame or a data size of the first compressed frame.

15. The computer-implemented method of claim 14, the method comprising deriving a spatial complexity of the first compressed frame from the at least one parameter.

16. The computer-implemented method of claim 15, the method comprising employing the spatial complexity of the first compressed frame to select at least one linear coefficient from at least one vector correlating spatial complexity values to linear coefficients, the opinion metric of image quality associated with the at least one viewing characteristic comprising the at least one linear coefficient.

17. The computer-implemented method of claim 16, the method comprising deriving the at least one vector from opinion scores associated with viewing multiple motion videos of a training set of motion videos using another viewing device having the at least one viewing characteristic.

18. The computer-implemented method of claim 13, the at least one viewing characteristic comprising at least one of a display size, a display resolution or a viewing distance.

19. The computer-implemented method of claim 13, the method comprising transmitting the motion video in a compressed form comprising the first and second compressed frames to the viewing device.

20. At least one machine-readable storage medium comprising instructions that when executed by a computing device, cause the computing device to:
compress a first uncompressed frame of a motion video to generate a first compressed frame of the motion video for a viewing device of at least one viewing characteristic;
combine a structural metric of image quality of the first compressed frame and an opinion metric of image quality associated with the at least one viewing characteristic to derive an estimated mean opinion score (MOS); and
determine whether to alter a quantization parameter (QP) to compress a second uncompressed frame of the motion video based on the estimated MOS.

21. The at least one machine-readable storage medium of claim 20, the computing device caused to decompress the first compressed frame to derive at least one parameter of the first compressed frame, the at least one parameter comprising at least one of a QP employed in generating the first compressed frame, a resolution of the first compressed frame, a type of the first compressed frame or a data size of the first compressed frame.

22. The at least one machine-readable storage medium of claim 21, the computing device caused to derive a spatial complexity of the first compressed frame from the at least one parameter.

23. The at least one machine-readable storage medium of claim 22, the computing device caused to employ the spatial complexity of the first compressed frame to select at least one linear coefficient from at least one vector correlating spatial complexity values to linear coefficients, the opinion metric of image quality associated with the at least one viewing characteristic comprising the at least one linear coefficient.

24. The at least one machine-readable storage medium of claim 20, the computing device caused to quantize frequency domain coefficients associated with the second uncompressed frame according to the QP to generate a second compressed frame.

25. The at least one machine-readable storage medium of claim 20, the computing device caused to transmit the motion video in a compressed form comprising the first and second compressed frames to the viewing device.

* * * * *